US007245491B2

(12) United States Patent
Throckmorton et al.

(10) Patent No.: US 7,245,491 B2
(45) Date of Patent: Jul. 17, 2007

(54) STORAGE MEDIUM PROTECTION SYSTEM

(75) Inventors: John A. Throckmorton, Waynesburg, PA (US); Timothy A. Baily, Waynesburg, PA (US)

(73) Assignee: Digital Site Management LLC, Waynesburg, PA (US)

( * ) Notice: Subject to any disclaimer, the term of this patent is extended or adjusted under 35 U.S.C. 154(b) by 4 days.

(21) Appl. No.: 11/209,179

(22) Filed: Aug. 22, 2005

(65) Prior Publication Data

US 2006/0064709 A1    Mar. 23, 2006

Related U.S. Application Data

(60) Provisional application No. 60/603,051, filed on Aug. 20, 2004.

(51) Int. Cl.
*H05K 7/20*    (2006.01)
(52) U.S. Cl. .................. 361/695; 361/690; 361/692; 726/34; 307/125
(58) Field of Classification Search ............. 361/683, 361/679, 690, 692, 694, 695; 174/52.3; 395/188, 395/188.1, 186, 775; 307/125; 726/34
See application file for complete search history.

(56) References Cited

U.S. PATENT DOCUMENTS

| 4,480,148 | A |   | 10/1984 | Archer |   |
|---|---|---|---|---|---|
| 4,685,303 | A |   | 8/1987 | Branc et al. |   |
| 4,694,119 | A |   | 9/1987 | Groenewegen |   |
| 4,831,476 | A |   | 5/1989 | Branc et al. |   |
| 4,944,401 | A |   | 7/1990 | Groenewegen |   |
| 5,123,538 | A |   | 6/1992 | Groenewegen |   |
| 5,479,341 | A | * | 12/1995 | Pihl et al. ................. 700/79 |
| 5,555,156 | A |   | 9/1996 | Decante |   |
| 5,623,597 | A | * | 4/1997 | Kikinis ................... 726/18 |
| 2005/0286225 | A1 | * | 12/2005 | Moore et al. ........... 361/695 |
| 2006/0075509 | A1 | * | 4/2006 | Kishon ................... 726/34 |

* cited by examiner

*Primary Examiner*—Michael Datskovskiy
(74) *Attorney, Agent, or Firm*—The Webb Law Firm

(57) ABSTRACT

Disclosed is a storage medium protection system for protecting one or more storage media from the effects of one or more undesirable conditions. The system includes an enclosure formed from a material resistant to the one or more undesirable conditions, and the storage medium is positioned within the interior of the enclosure. Further, the system provides a sealing mechanism for sealing a circulation passageway of the enclosure in the event of an occurrence of the one or more undesirable conditions.

16 Claims, 21 Drawing Sheets

STORAGE MEDIUM PROTECTION SYSTEM

CROSS REFERENCE TO RELATED APPLICATIONS

This application claims priority to U.S. Patent Application No. 60/603,051, filed Aug. 20, 2004, which is incorporated herein by reference in its entirety.

BACKGROUND OF THE INVENTION

1. Field of the Invention

The present invention relates generally to protection systems and enclosures for protecting specified items in harsh environmental situations, such as flood, fire, etc. and, in particular, to a storage medium protection system that provides a secure enclosure to protect a user's storage medium, such as a hard drive or other valuable media, in the case of such an adverse physical or harsh environmental occurrence or condition.

2. Description of Related Art

As technology advances and information chiefly resides in electronic form, as opposed to paper form, the value of this information is exceedingly important. Accordingly, there is a need to protect this information during certain situations. For example, when using a typical personal computer or laptop, with a hard drive or similar storage medium therein, the information stored on the storage medium is subject to outside conditions, such as adverse physical or harsh environmental occurrences or conditions. If a flood or fire would occur, and this condition impacts a personal computer or a laptop, all of the data and information stored on the hard drive would be lost if not properly backed up. Unfortunately, very few people back up their hard drives on a regular basis, and this "back-up" procedure typically occurs only sporadically, even in a corporate setting.

In order to protect the data on one's hard drive, many presently-available systems require the user to continually upload the data to an offsite location. Other systems require the user to save a copy of important data or information to a DVD or CD ROM. However, both of these methods are very time consuming, and renting hard drive or storage space at an offsite location is extremely expensive, especially when considering long-term storage. In addition, most users, whether on a personal level or a corporate level, are resistant to taking the time and the necessary steps to back up the data.

One well-known system for protection of data is a "Black Box" enclosure. This type of enclosure provides a local data protection system, however, this Black Box uses a solid state memory chip, which has no moving parts. Such solid state memory chips must not overheat, as there is no air flow inside the enclosure. Still further, a solid state memory chip is highly expensive technology to purchase and implement, and accordingly, these Black Boxes are typically only used by large corporate entities or airlines.

Accordingly, there is a need in the art to provide a storage medium protection system that provides a safe and easy way to back up or store data at an onsite location. There is also a need for an onsite storage mechanism that is affordable by the consumer, and protects the consumer's data on the storage medium in the event of a harsh environmental situation or other undesirable conditions.

SUMMARY OF THE INVENTION

Accordingly, it is an object of the present invention to provide a storage medium protection system that addresses the above-identified concerns and overcomes the shortcomings of conventional protection systems and methods. It is another object of the present invention to provide a storage medium protection system that provides a safe repository for information and data that will not be affected by harsh environmental situations or undesirable conditions. It is a further object of the present invention to provide a hard drive protection system that allows the data on one's hard drive or storage medium to be backed-up or otherwise saved and stored locally, or at an onsite location. It is yet another object of the present invention to provide a storage medium protection system that is affordable to a typical consumer. It is a further object of the present invention to provide a storage medium protection system that does not require continual upload of data to an offsite location or storage to another medium.

Accordingly, the present invention is directed to a storage medium protection system for protecting one or more storage media, such as hard drives, from the effects of one or more undesirable conditions. The system includes an enclosure formed from a specified material resistant to the undesirable condition, and the storage medium is positioned within an interior area of the enclosure. At least one circulation passageway extends through a wall of the enclosure. This circulation passageway permits fluid communication of a cooling medium, such as air, to and/or from the interior area of the enclosure.

A cooling mechanism is in operational communication with the interior area of the enclosure and operates to cool the storage medium. In addition, the system includes a sealing mechanism for sealing the circulation passageway in the event of the undesirable condition, and, further, this sealing mechanism is at least partially formed from the specified material that is resistant to the undesirable conditions. During the event of such an undesirable condition, and when sealed, the enclosure represents a fully sealed enclosure for protecting the storage medium from the effects of the situation or condition.

The present invention is further directed to a method of protecting a storage medium from the effects of one or more undesirable conditions. This method includes the steps of: (i) positioning a storage medium in an interior area of an enclosure formed from a material resistant to the undesirable condition; (ii) circulating a cooling medium through the interior area of the enclosure via at least one circulation passageway extending through a wall of the enclosure; (iii) cooling the storage medium; and (iv) in the event of an undesirable condition, sealing the circulation passageway.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE PREFERRED EMBODIMENTS

Figure 1:
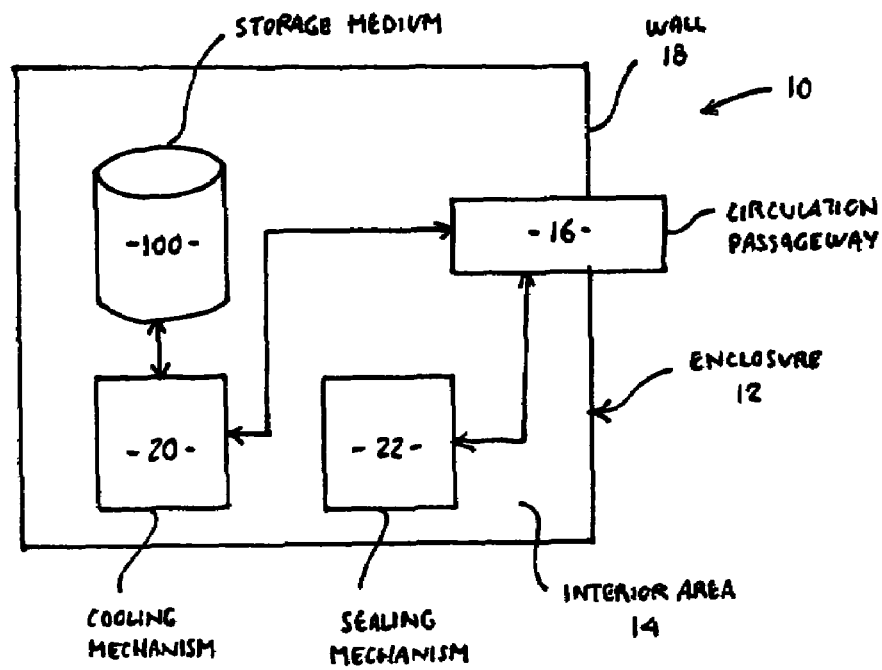
FIG. 1 is a schematic view a storage medium protection system according to the present invention.

The present invention is directed to a storage medium protection system 10, as illustrated in various embodiments in FIGS. 1-22, and in use in connection with one or more storage media 100, such as a hard drive or the like. In particular, the storage medium protection system 10 is designed to protect one or more storage media 100, such as one or more hard drives, in the event of a harsh environmental condition or other undesirable situation, such that any data or information residing on the storage medium 100 is not lost, damaged or otherwise affected.

The system 10 includes an enclosure 12, which is formed from a specified material resistant to the undesirable condition. The storage medium 100 is positioned within an interior area 14 of the enclosure 12. Further, one or more circulation passageways 16 extend through a wall 18 of the enclosure 12. These passageways 16 permit fluid communication of a cooling medium, such as air A, through the interior area 14 of the enclosure 12, such as between the interior area 14 and ambient air, or the space around the enclosure 12. While air A is discussed in many of the embodiments of the present invention, any number of cooling media are envisioned. For example, the cooling medium could be a refrigerant flowing through a tube, which extends through the circulation passageway 16.

A cooling mechanism 20 is in operational communication with the interior area 14 of the enclosure 12. This cooling mechanism 20 serves to effectively cool the storage medium 100, such that the storage medium 100 does not overheat, with the possible result of lost or damaged data. The cooling mechanism 20 could be positioned within the interior area 14 of the enclosure 12, or adjacent or outside of the enclosure 12. Regardless of position or placement, the cooling mechanism 20 is operable to cool the storage medium 100, either during typical operations, or even during the undesirable condition.

In addition, the system 10 includes a sealing mechanism 22. This sealing mechanism 22 seals the circulation passageways 16 in the event of the undesirable condition. Further, as with the enclosure 12, the sealing mechanism 22 is at least partially formed from the specified material, which is resistant to the undesirable condition. See FIG. 1. If a component extends through the circulation passageway 16, such as a tube (for refrigerant flow), the sealing mechanism 22 would serve to clamp, sever or otherwise seal the tube, as well as the passageway 16 through which it extends.

Any number of undesirable conditions are envisioned. For example, the undesirable condition may be an environmental situation or other physical effect. This undesirable condition may be tampering, fire, flood, heat, humidity, water, lightening, pressure, impact, or any combination thereof. Accordingly, the specified material can be tamper-proof, fireproof, heat resistant, waterproof, water resistant, lightening-proof, impact resistant, pressure resistant, etc. Any combination of these characteristics can be obtained using the correct materials having such well-known properties.

In particular, the enclosure 12 and/or the sealing mechanism 22 are formed from materials that would protect the storage medium 100 in a variety of situations. For example, under flood conditions, and once sealed, the enclosure 12 could be waterproof (to protect against water damage), pressure resistant (to protect against sunken or deepwater pressure situations) and impact resistant (to protect against the enclosure 12 contacting other objects, or other objects contacting the enclosure 12). Therefore, any combination of properties could be obtained through material selection.

Figure 2:
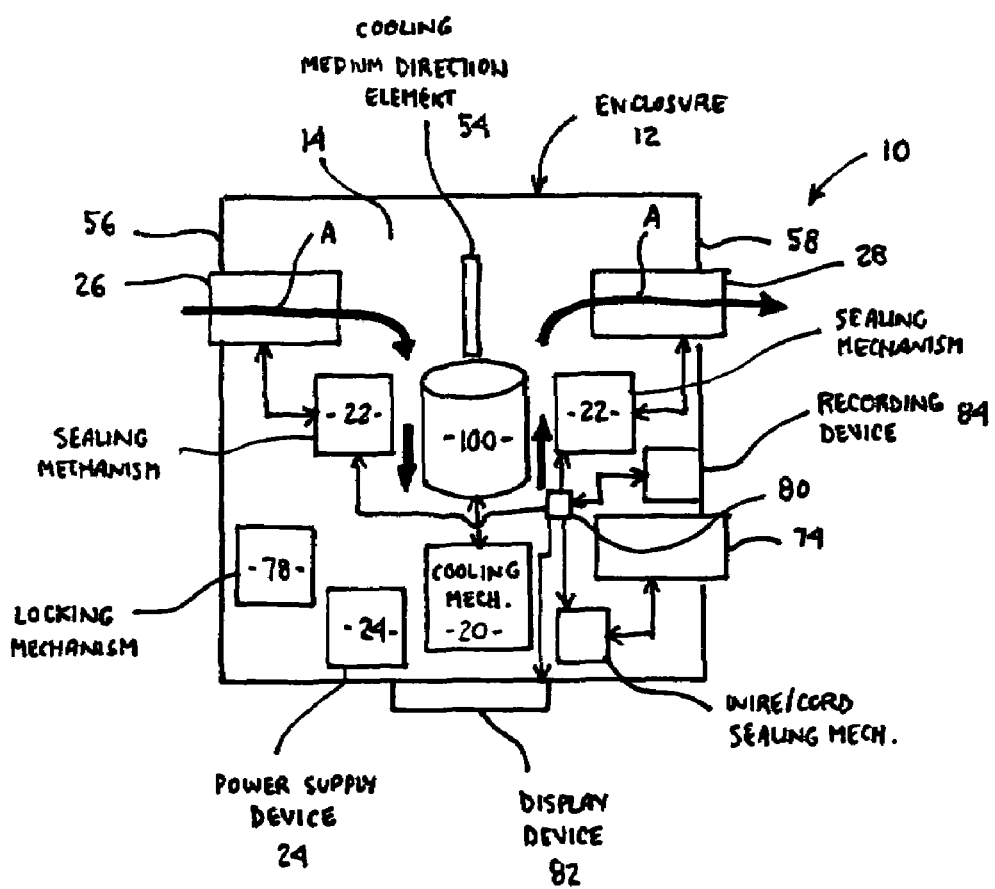
FIG. 2 is a schematic view of one embodiment of a storage medium protection system according to the present invention.
Figure 3:
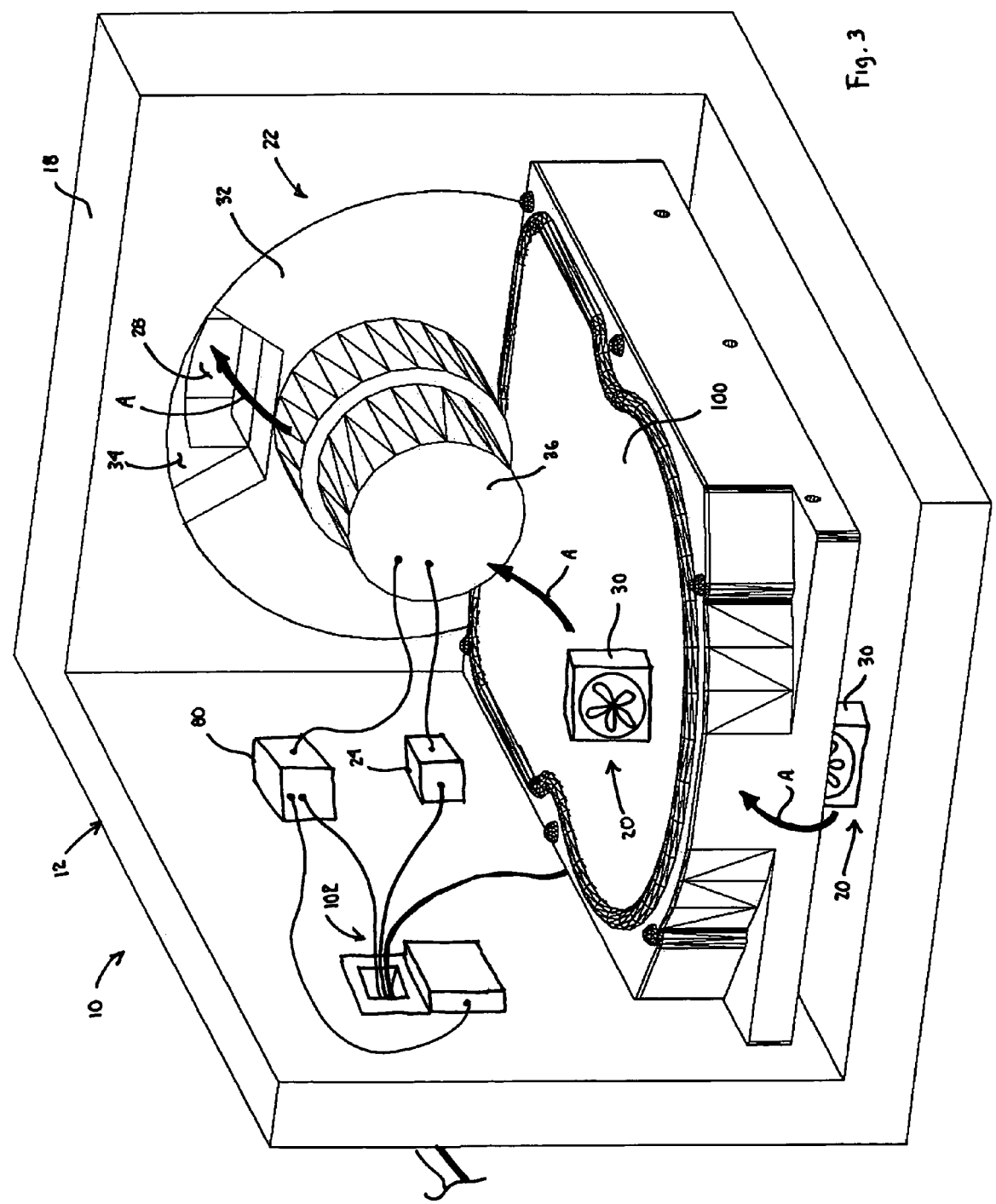
FIG. 3 is a schematic and perspective cut-away view of another embodiment of a storage medium protection system according to the present invention.

As seen in the embodiments of FIGS. 2 and 3, a power supply device 24 may be positioned in the interior area 14 of the enclosure 12 for providing power to the storage medium 100, the cooling mechanism 20, the sealing mechanism 22, or any of the other components and subcomponents of the system 10. For example, a power supply device 24 may be a battery, such as a rechargeable battery, that is continually charged through an outside source, but when the enclosure 12 is sealed during an undesirable condition, continues to provide for the power needs of the various power components of the system, such as the sealing mechanism 22, the cooling mechanism 20, the storage medium 100, etc. Any type of power supply device 24 is envisioned, such as a rechargeable battery, rechargeable circuit, a flash power device, etc.

Figure 5:
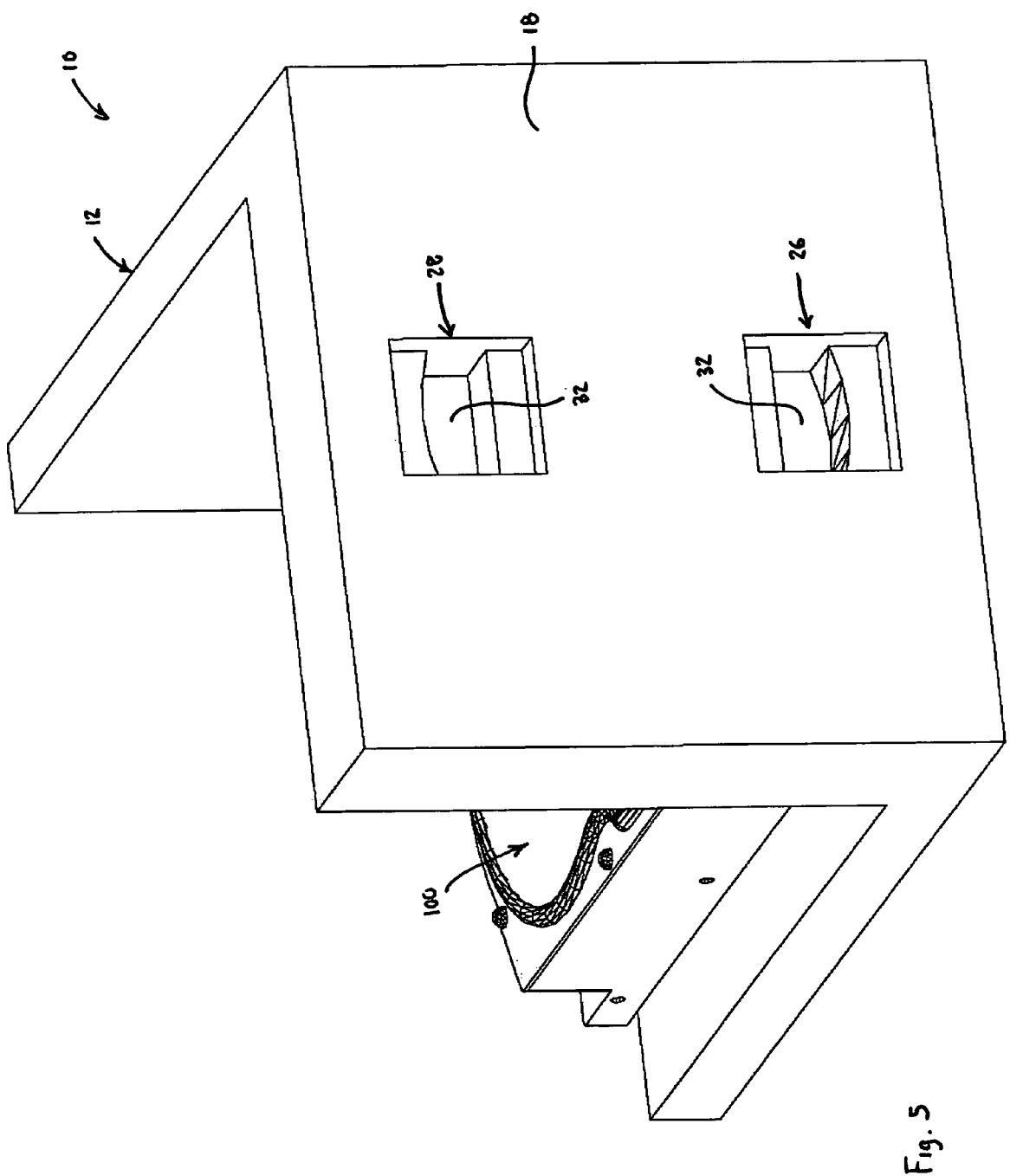
FIG. 5 is a further perspective, cut-away view of the system of FIG. 4.
Figure 6:
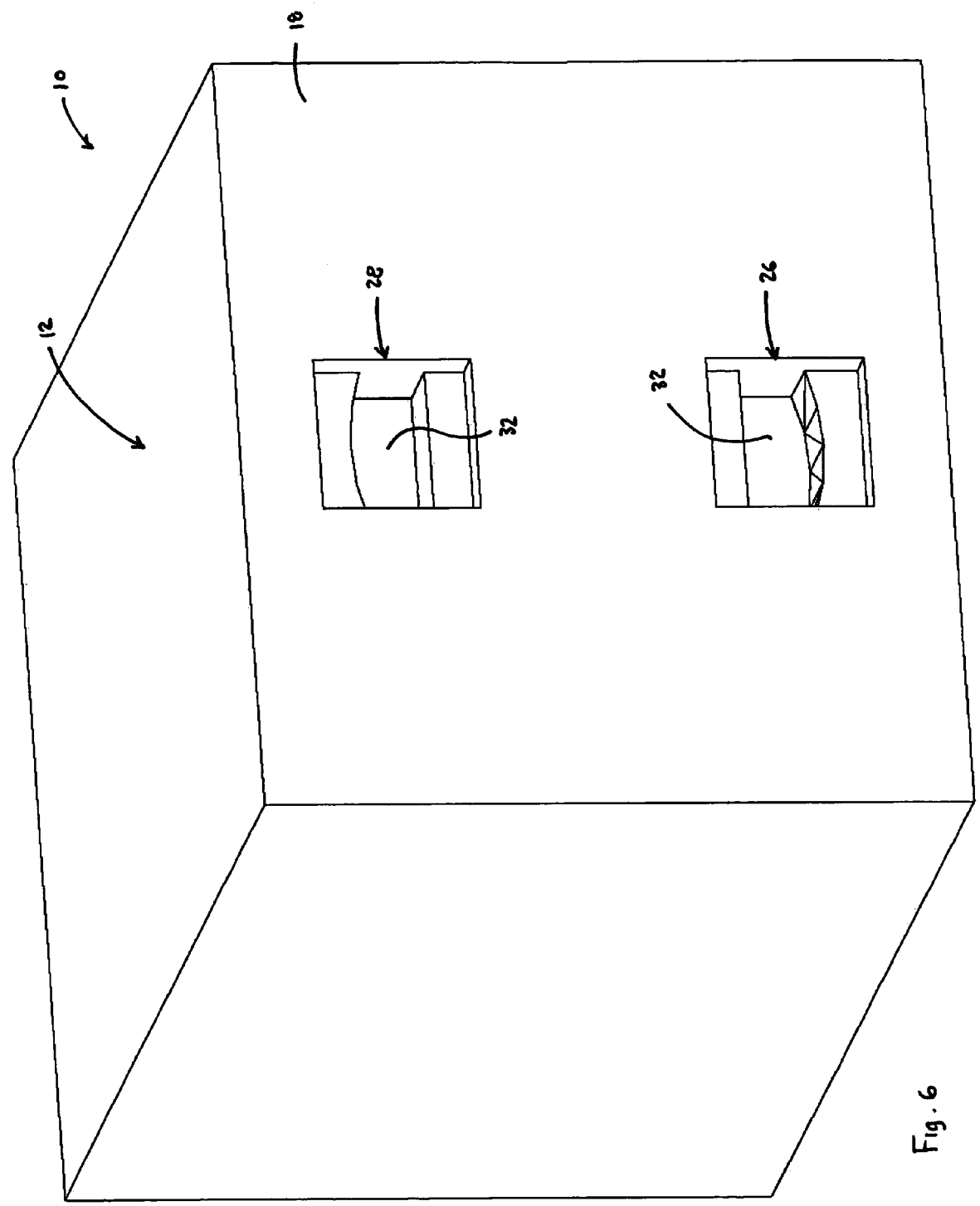
FIG. 6 is a further perspective view of the system of FIG. 4.

As best seen in FIGS. 2, 5 and 6, the system 10 may also include an entry circulation passageway 26, and an exit circulation passageway 28. Although not intended to be limiting, in this embodiment, the cooling medium is air A. Accordingly, the entry circulation passageway 26 is in fluid communication with the ambient air, and allows air A to be drawn through the passageway 26 and circulated in the interior area 14 of the enclosure 12. Similarly, the exit circulation passageway 28 is in fluid communication with the ambient air, and it allows the circulated air A to exit or be otherwise exhausted from the interior area 14 of the enclosure 12. In this embodiment, both the entry circulation passageway 26 and the exit circulation passageway 28 are sealed by either an individual or respective sealing mechanism 22, dependent upon the location of each passageway 26, 28. In any case, both passageways 26, 28 are capable of being sealed in the event of the undesirable condition, such that the enclosure 12 is a totally enclosed and safe environment. Furthermore, when using alternative cooling mechanism 20 (such as a refrigeration system or the like), the circulation passageways 26, 28 could be used to allow fluid communication (and heat transfer) between the interior area 14 of the enclosure 12 and ambient air.

In one embodiment and as shown in FIG. 3, the cooling mechanism 20 is at least one fan 30 positioned within the interior area 14 of the enclosure 12. The fan 30 serves to draw ambient air through the entry circulation passageway 26, circulate the air A through the interior area 14 of the enclosure 12, and force the circulated air A out of the exit circulation passageway 28. Preferably, the air is drawn and forced through the interior area 14 of the enclosure 12 in a manner that is beneficial to cooling the storage medium 100.

As seen in the embodiment of FIG. 3, the air A is drawn in below the storage medium 100 and is circulated using two fans 30 to push the air over the top of the storage medium 100 and out the exit circulation passageway 28. Of course, any positioning and effective circulation of air A is envisioned. For example, the fan 30 may be positioned outside of the enclosure 12, and be operated to force the air into the interior area 14, based upon its position with respect to the circulation passageway(s) 16.

FIGS. 3-6 illustrate one preferred embodiment of the sealing mechanism 22. In particular, in this embodiment, the sealing mechanism 22 is a rotating door 32, which is positioned substantially adjacent the circulation passageways 26, 28. In the event of an undesirable condition, the rotating door 32 rotates over and seals the circulation passageways 26, 28, thereby preventing access or effect by the undesirable condition. At least a portion of the door 32 (or in other embodiments, the sealing mechanism 22) is formed from the specified material, such that, when the enclosure 12 is sealed, it is resistant to the undesirable condition. With respect to the present embodiment, and when in operation, the rotating door 32 is a circular structure with two cutouts 34, which, when aligned with the circulation passageways 26, 28 allow the flow of air A to and from these passageways 26, 28.

Figure 4:
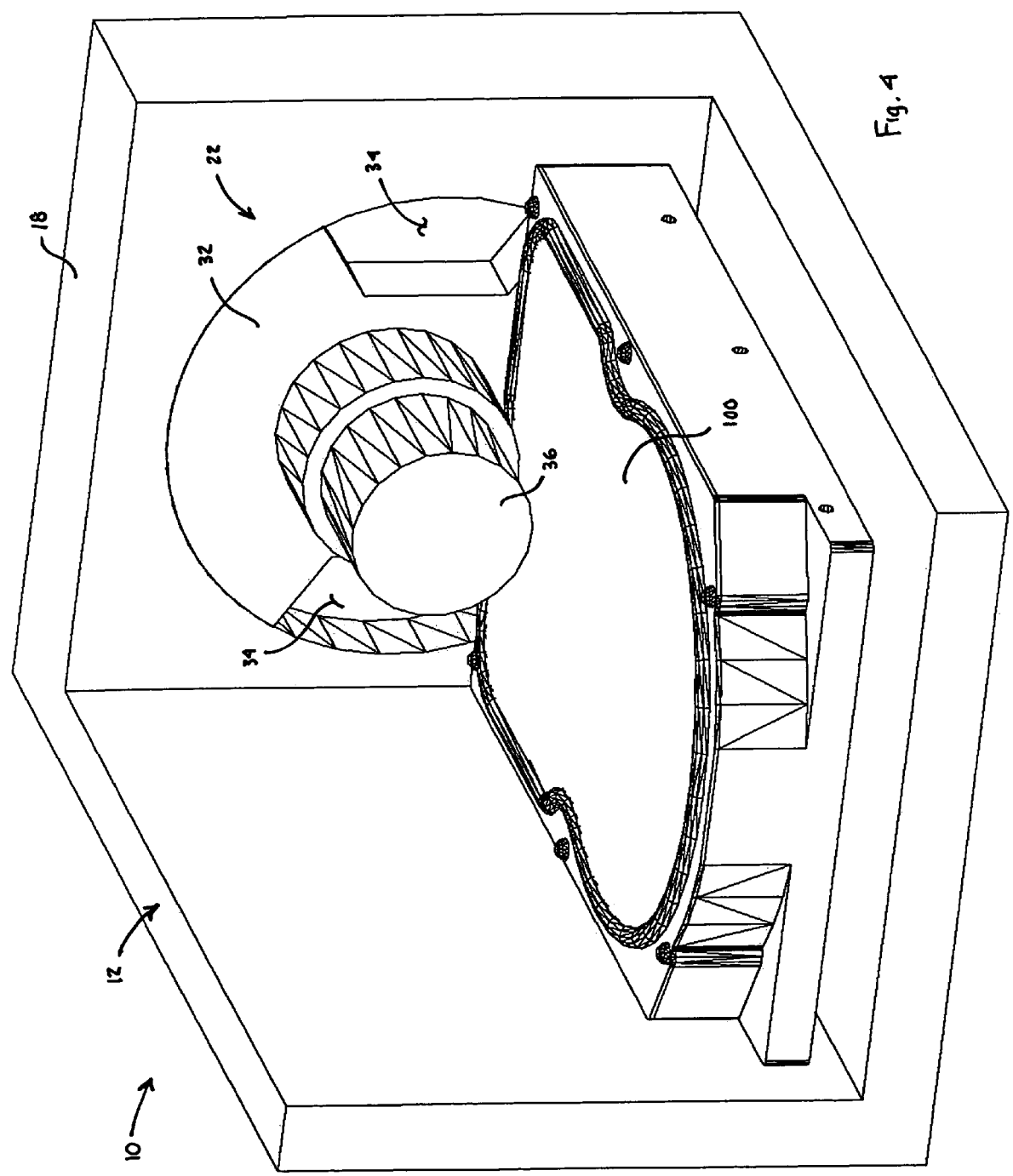
FIG. 4 is a perspective, cut-away view of a further embodiment of a storage medium protection system according to the present invention.

As seen in an open condition in FIG. 3, the air is permitted to move through the circulation passageways 26, 28, and effectively cool the storage medium 100 in operation. However, in the event of the undesirable condition, and as illustrated in FIGS. 4-6, the rotating door 32 is rotated to a closed position, such that the cutouts 34 are no longer aligned with the passageways 26, 28. In this manner, the rotating door 32 blocks and seals the passageways 26, 28. In order to effect this rotation or movement, a motor 36, such as a DC motor, can be used to actuate and rotate the door 32. As discussed above, this motor 36 can be powered by the power supply device 24, or some other independent power supply. In addition, any means of actuating the door 32 is envisioned.

As is best seen in FIGS. 5 and 6, in this embodiment, the entry circulation passageway 26 and the exit circulation passageway 28 are extending through a common wall 18 of the enclosure 12. This allows the cooling medium, in this case, air A, to be drawn in underneath the storage mechanism 100 and pushed out over the storage medium 100, in order to effect an appropriate cooling of the medium 100. In addition, such an arrangement allows a single sealing mechanism 22, namely the rotating door 32, to effect closure of both passageways 26, 28 in the event of the undesirable condition or harsh environmental situation. When the enclosure 12 is fully sealed, total protection of the medium 100 is achieved. Such total enclosure is illustrated in FIG. 6, where the enclosure 12 acts as a confined and safe box housing the medium 100, until the receipt of some instruction or other access by an authorized user to the interior area 14, after the undesirable condition has been removed.

Another embodiment of the system 10 is illustrated in FIGS. 7-11. In particular, in this embodiment, the sealing mechanism 22 is a retractable and extendable door 38 slidingly attached near the circulation passageway 16. In particular, as the present embodiment includes the entry circulation passageway 26 and the exit circulation passageway 28, two doors 38 are used and commonly attached to the motor 36. Specifically, each door 38 includes a rear sleeve 40 attached thereto, and this rear sleeve 40 is movable about a motor pin 42. In operation, the rear sleeve 40 is moved toward and away from the motor pin 42, as powered by the motor 36 during the undesirable condition.

Figure 7:
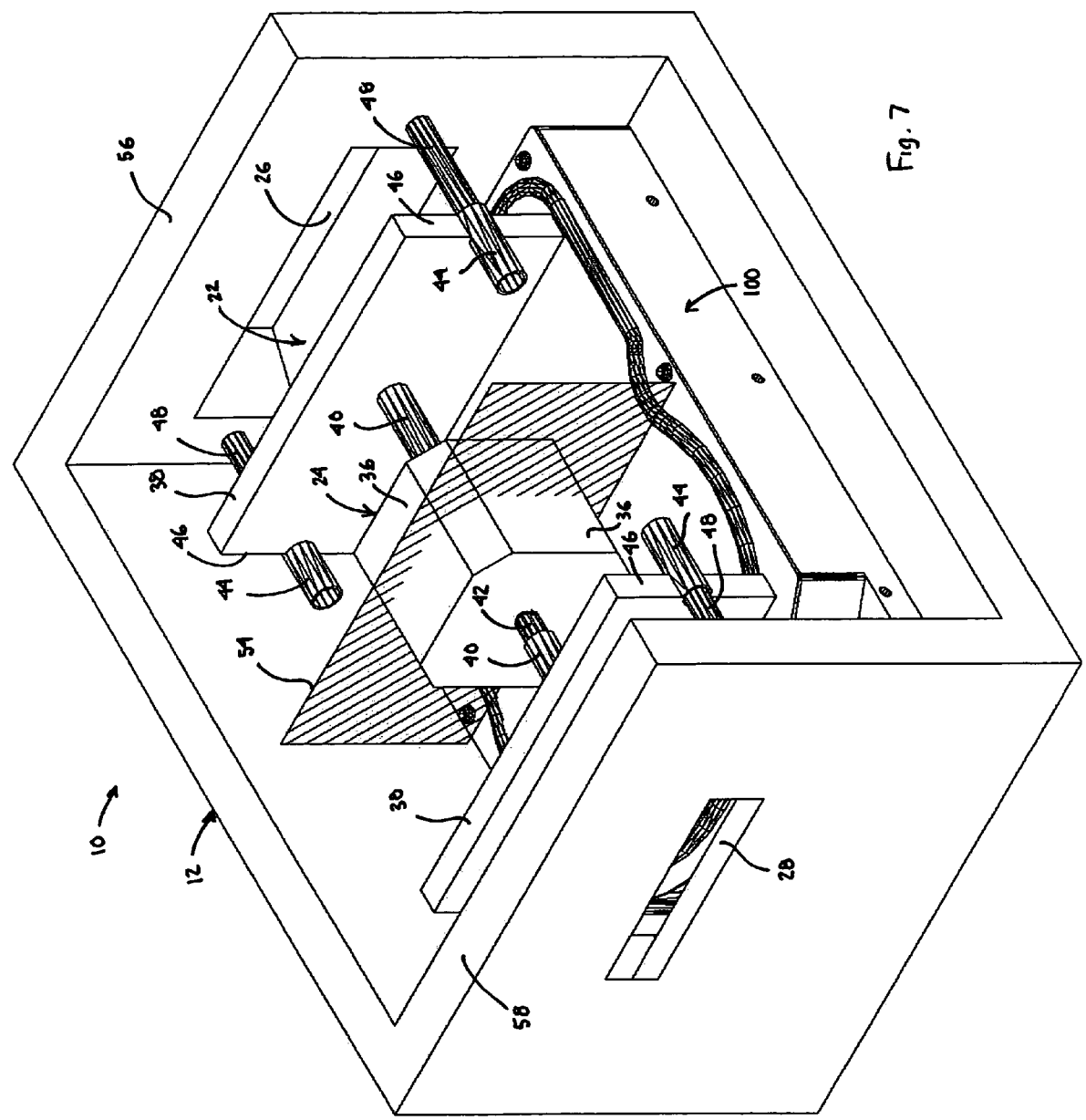
FIG. 7 is a perspective, cut-away view of another embodiment of a storage medium protection system according to the present invention.
Figure 8:
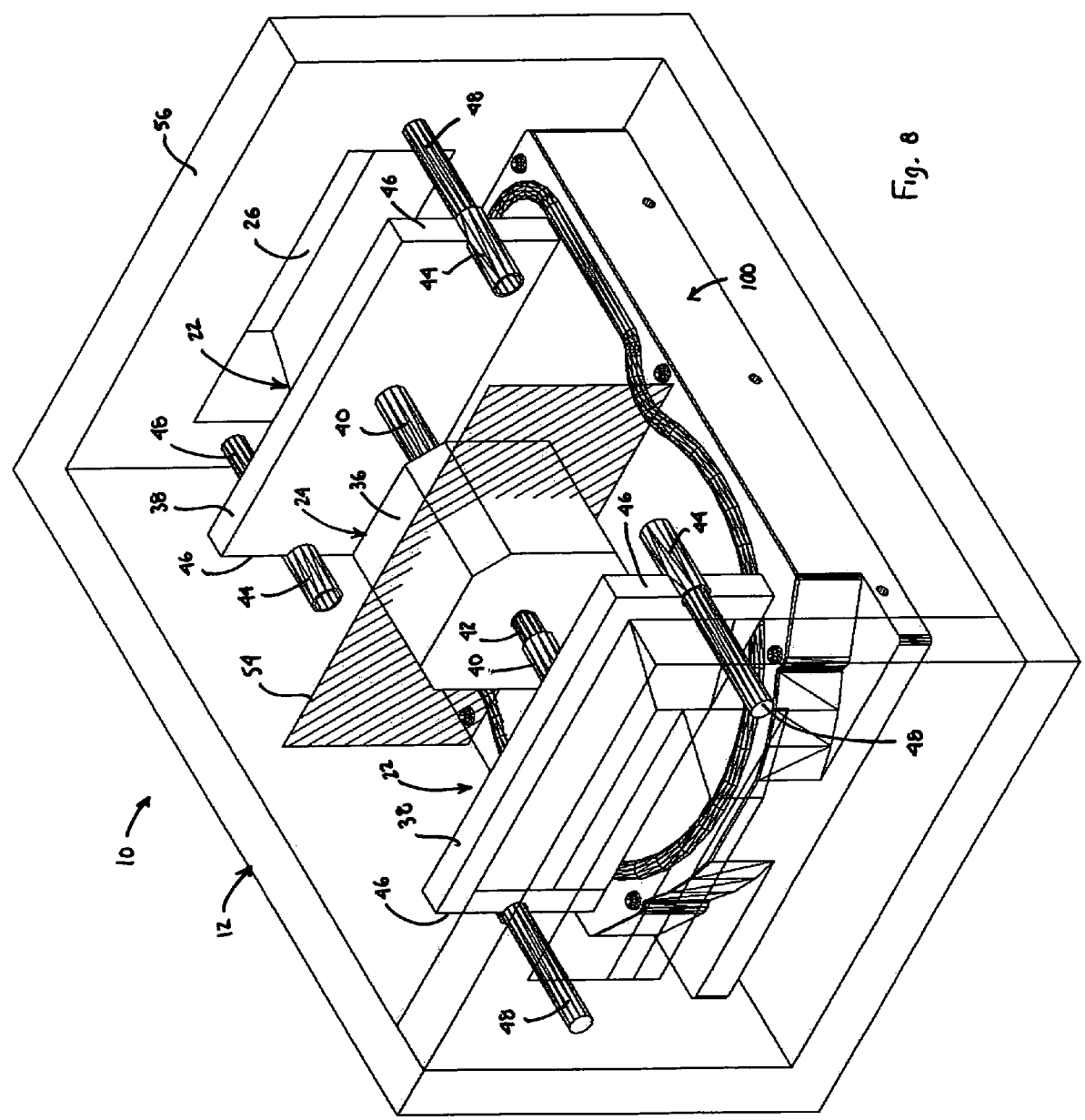
FIG. 8 is a further perspective, cut-away view of the system of FIG. 7.
Figure 11:
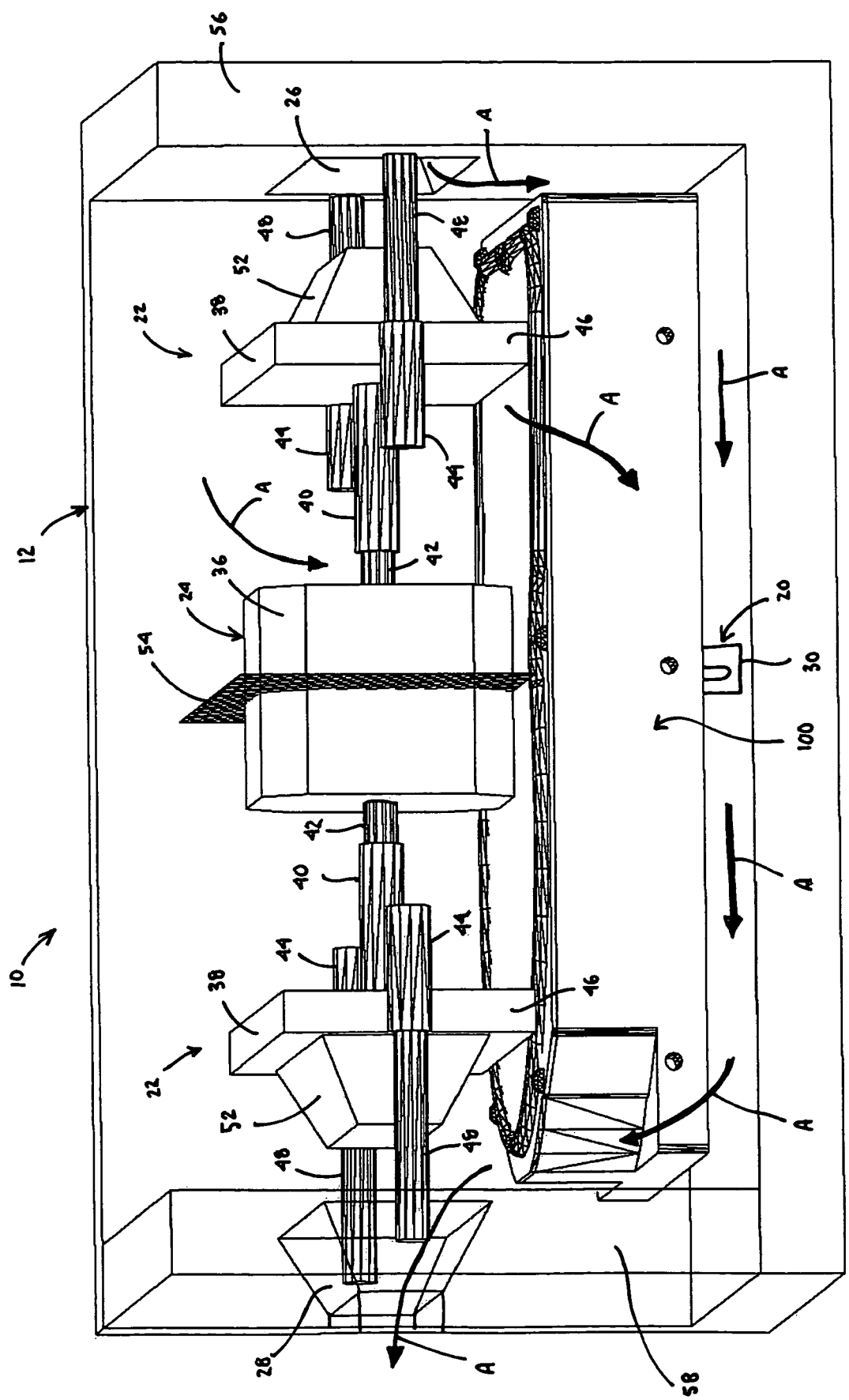
FIG. 11 is a side, cut-away view of the system of FIG. 7.

In addition, as best seen in FIGS. 7 and 8, the system 10 also includes two side sleeves 44 attached to a respective side 46 of the door 38. Further, as discussed above in connection with the motor 36, each side sleeve 44 is slidable over and along an enclosure pin 48, which is attached to an inner wall 50 of the enclosure 12. This embodiment, when in an open position, is illustrated in FIGS. 7, 8 and 11.

Figure 9:
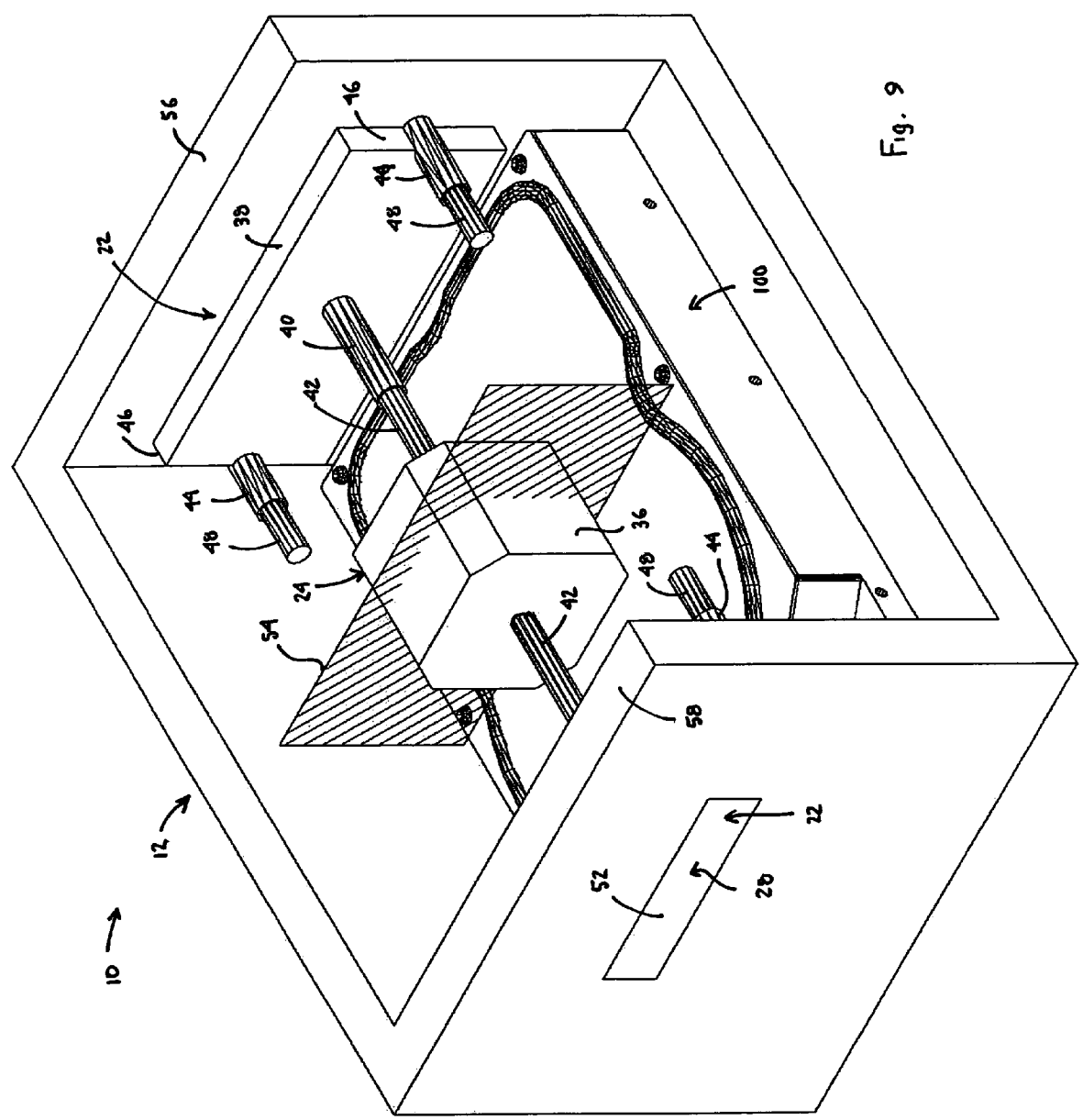
FIG. 9 is a further perspective, cut-away view of the system of FIG. 7.
Figure 10:
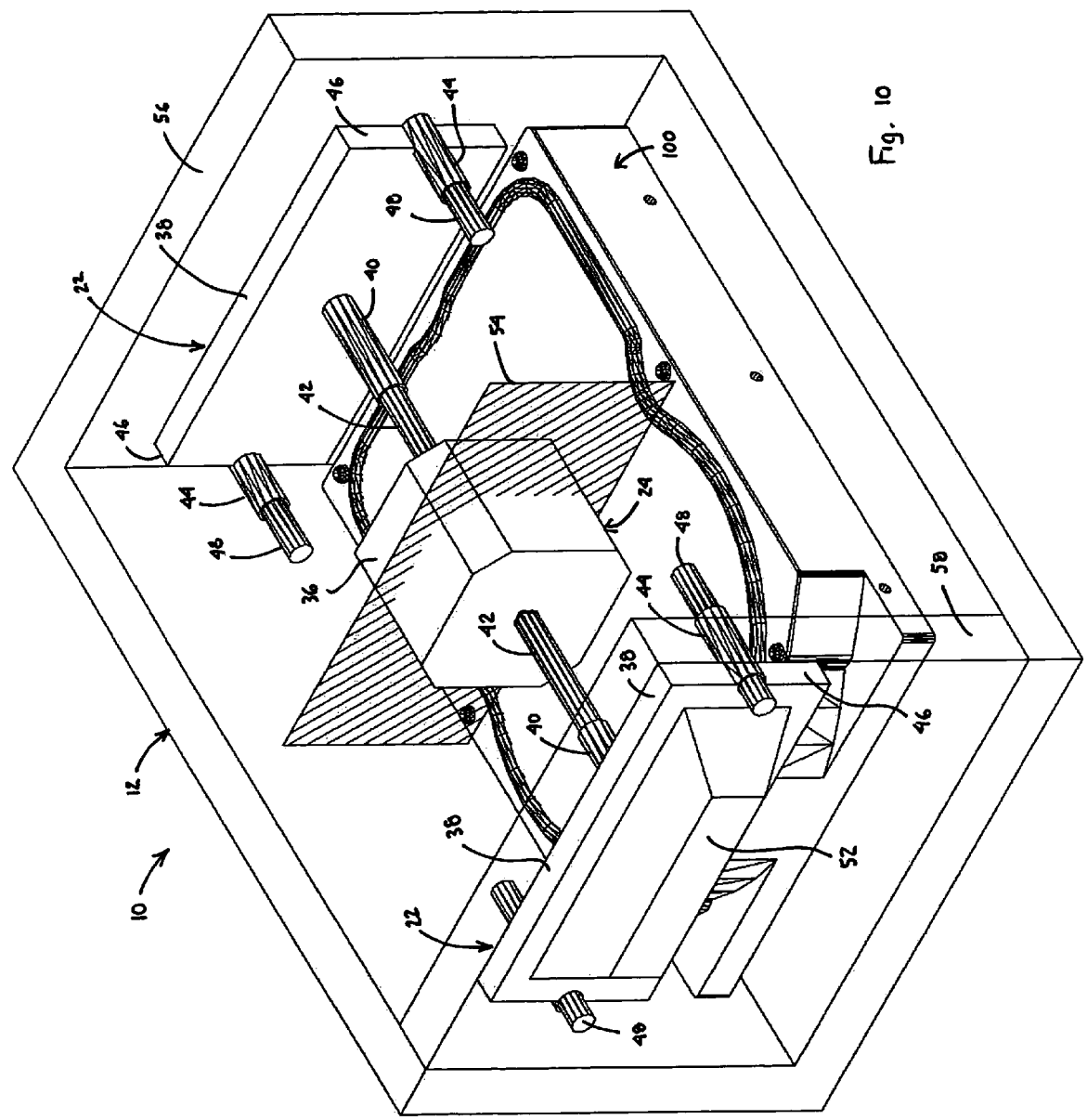
FIG. 10 is a still further perspective, cut-away view of the system of FIG. 7.

During the undesirable condition or event, the doors 38 close. This operation is best seen in FIGS. 9 and 10. In particular, the rear sleeve 40 is moved away from the motor pin 42 via power from the motor 36. Similarly, the side sleeves 44 are moved toward the inner wall 50 of the enclosure 12 over the respective enclosure pin 48, and until sealing and contact has occurred.

Another aspect of the present embodiment is the use of a door extension 52 extending from a portion of the door 38. Unlike the previous embodiment where the door 32 rotated to seal the passageways 26, 28, the door 38 of this embodiment is both extendable and retractable, and this door extension 52 allows for additional sealing characteristics. Specifically, the door extension 52 is sized and shaped so as to fit within the dimensions of the respective circulation passageway 26, 28. Therefore, as opposed to merely abutting the passageway 26, 28, which would only provide for a single contact surface, the present embodiment allows the door extension 52 to extend within and along the respective passageway 26, 28 to provide a thicker and more effective seal during the condition. See FIGS. 10 and 11.

Also seen in this embodiment is a cooling medium direction element 54. Typically, this cooling medium direction element 54 is useful when the cooling medium is air A.

Furthermore, the cooling medium direction element 54 is particularly useful in this embodiment, since unlike the previous embodiment where the passageways 26, 28 were on a common wall 18, the passageways 26, 28 of this embodiment extend through a respective first wall 56 and a second, opposing wall 58. Therefore, the cooling medium direction element 54 serves to force air A circulation underneath the storage medium 100 during the circulation process. Effecting this circulation through the use of the cooling medium direction element 54 is illustrated in FIG. 11.

A still further embodiment of the present invention is shown in FIGS. 12-16. In particular, the enclosure 12 may include a first enclosure portion 60 and a second enclosure portion 62. The first and second enclosure portions 60, 62 are spaced in an open position, which forms the circulation passageway 16. In a closed position, the first and second enclosure portions 60, 62 are abutting, thereby acting as the sealing mechanism 22 for sealing the circulation passageway 16 in the event of the undesirable condition.

Figure 12:
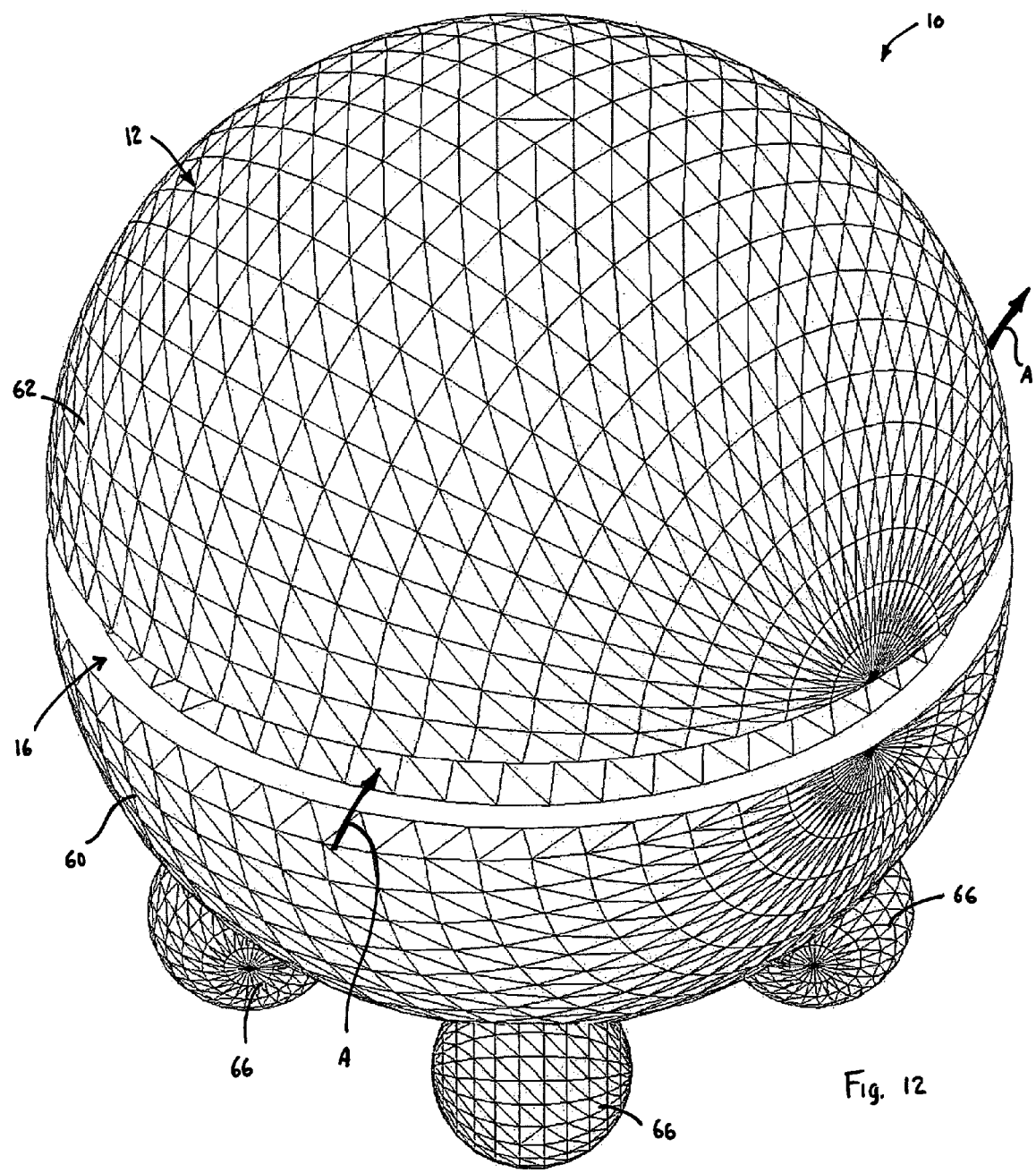
FIG. 12 is a perspective view of a still further embodiment of a storage medium protection system according to the present invention.
Figure 13:
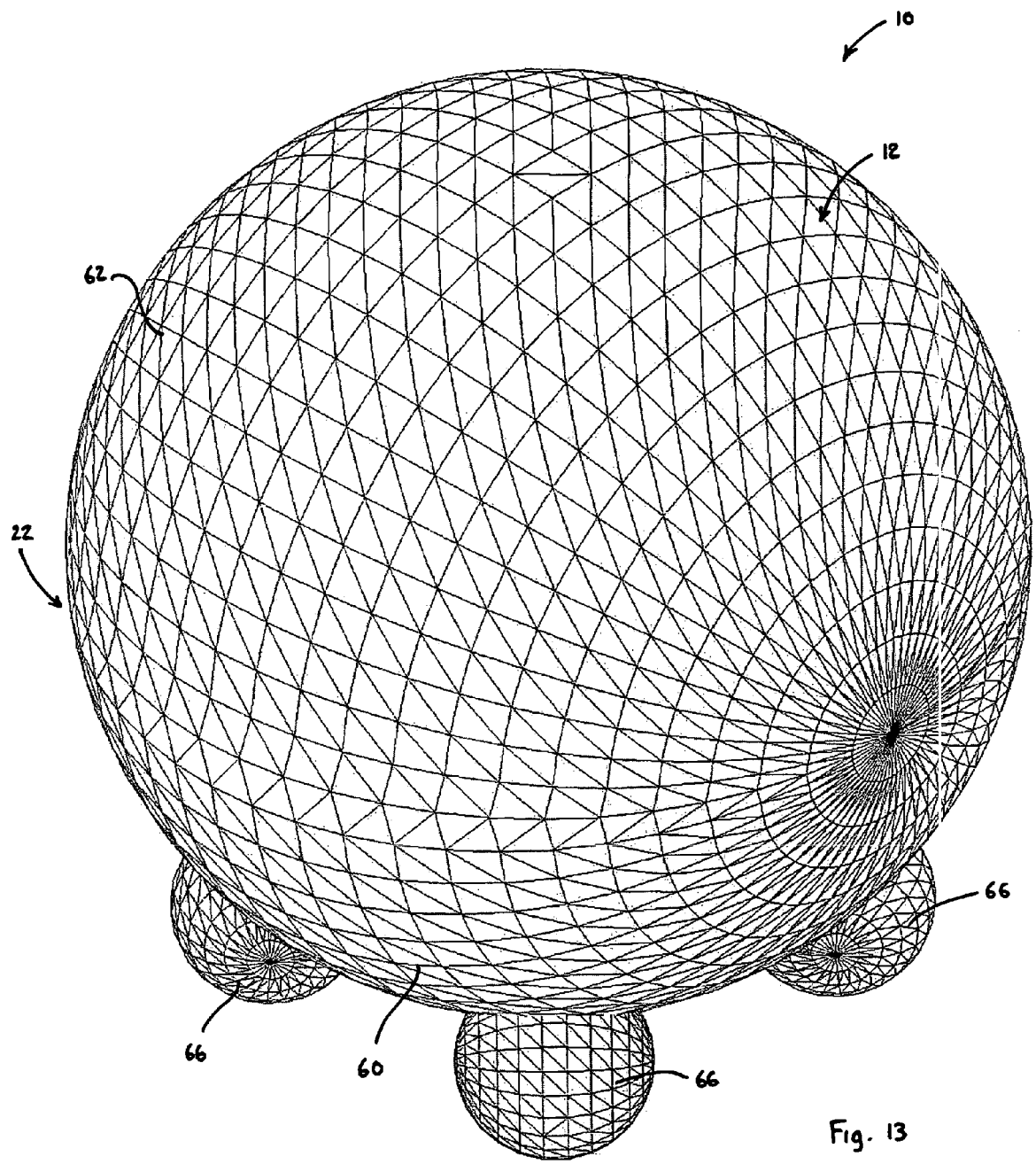
FIG. 13 is another perspective view of the system of FIG. 12.
Figure 14:
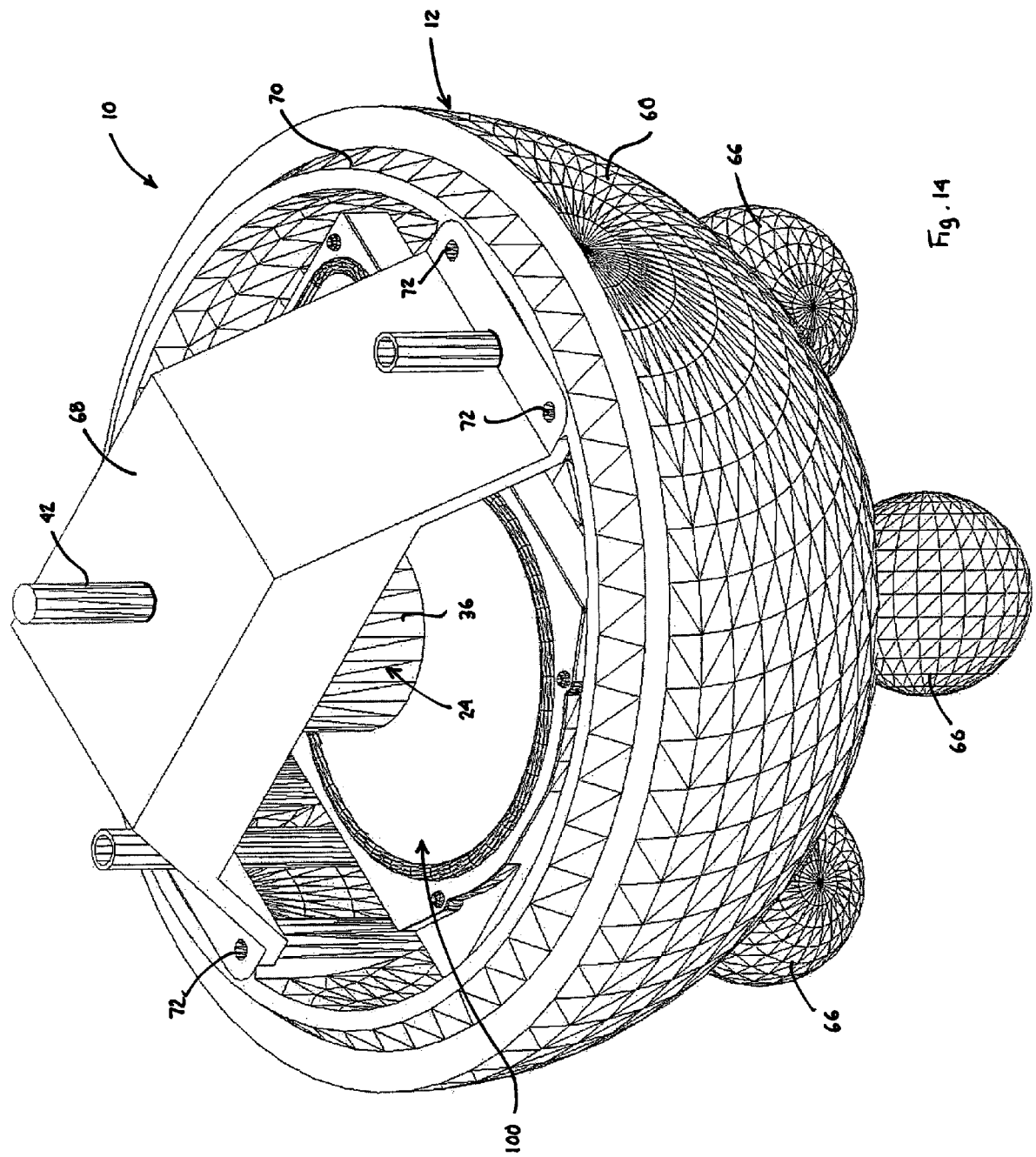
FIG. 14 is a further perspective view of the system of FIG. 12 with certain portions removed for clarity.
Figure 15:
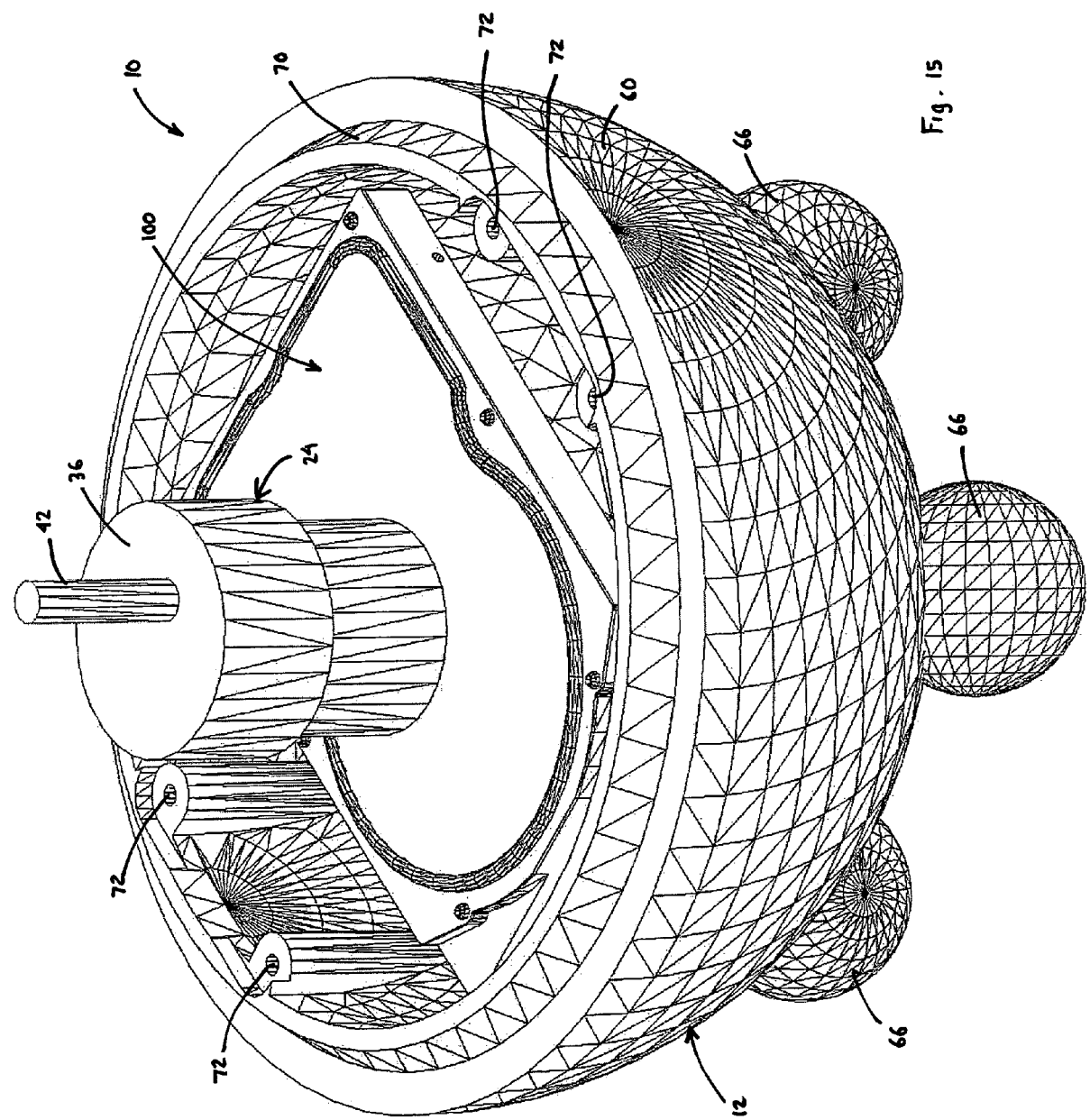
FIG. 15 is a further perspective view of the system of FIG. 12 with certain portions removed for clarity.
Figure 16:
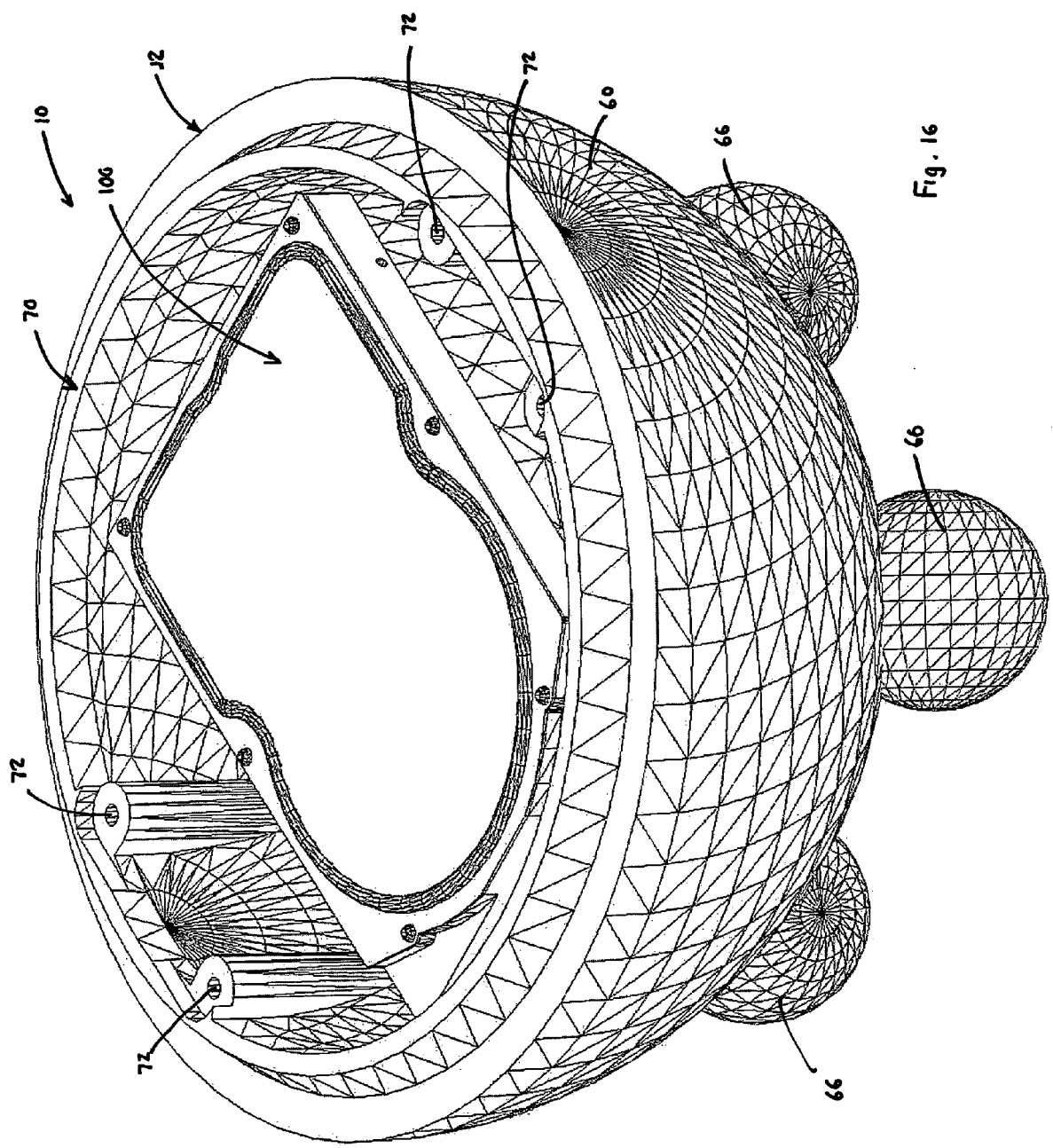
FIG. 16 is a further perspective view of the system of FIG. 12 with certain portions removed for clarity.
Figure 17:
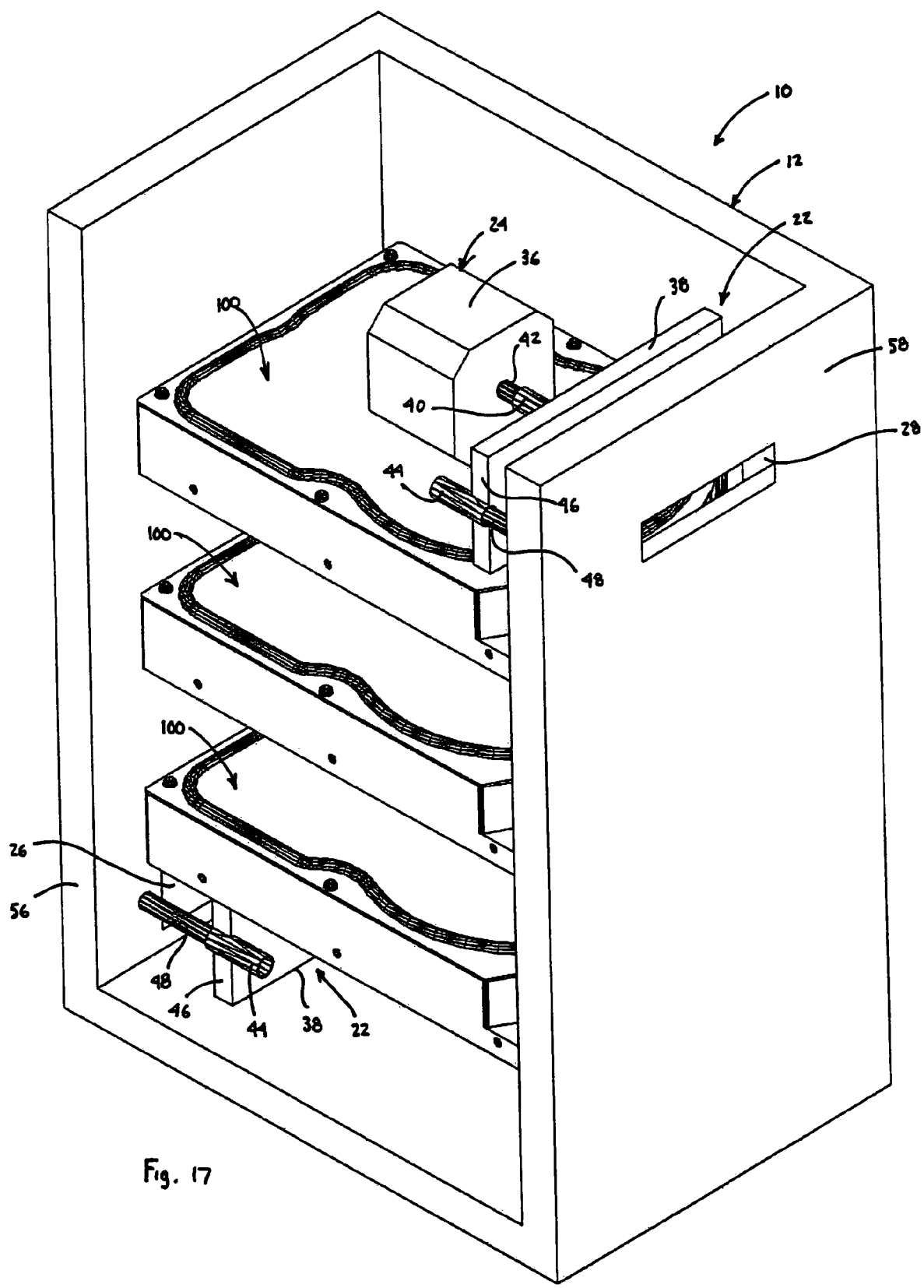
FIG. 17 is a perspective, cut-away view of yet another embodiment of a storage medium protection system according to the present invention.
Figure 18:
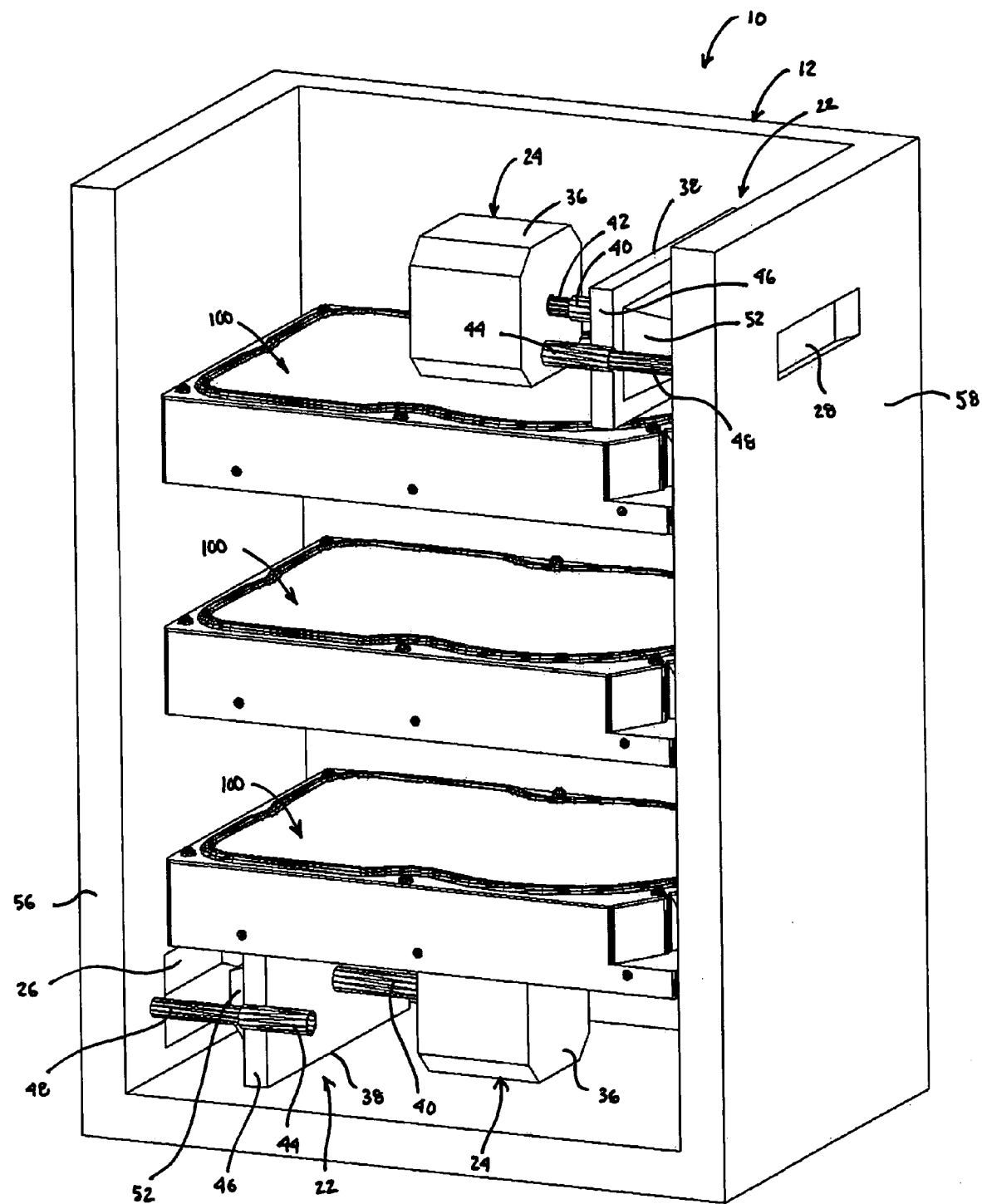
FIG. 18 is a further perspective, cut-away view of the system of FIG. 17.
Figure 19:
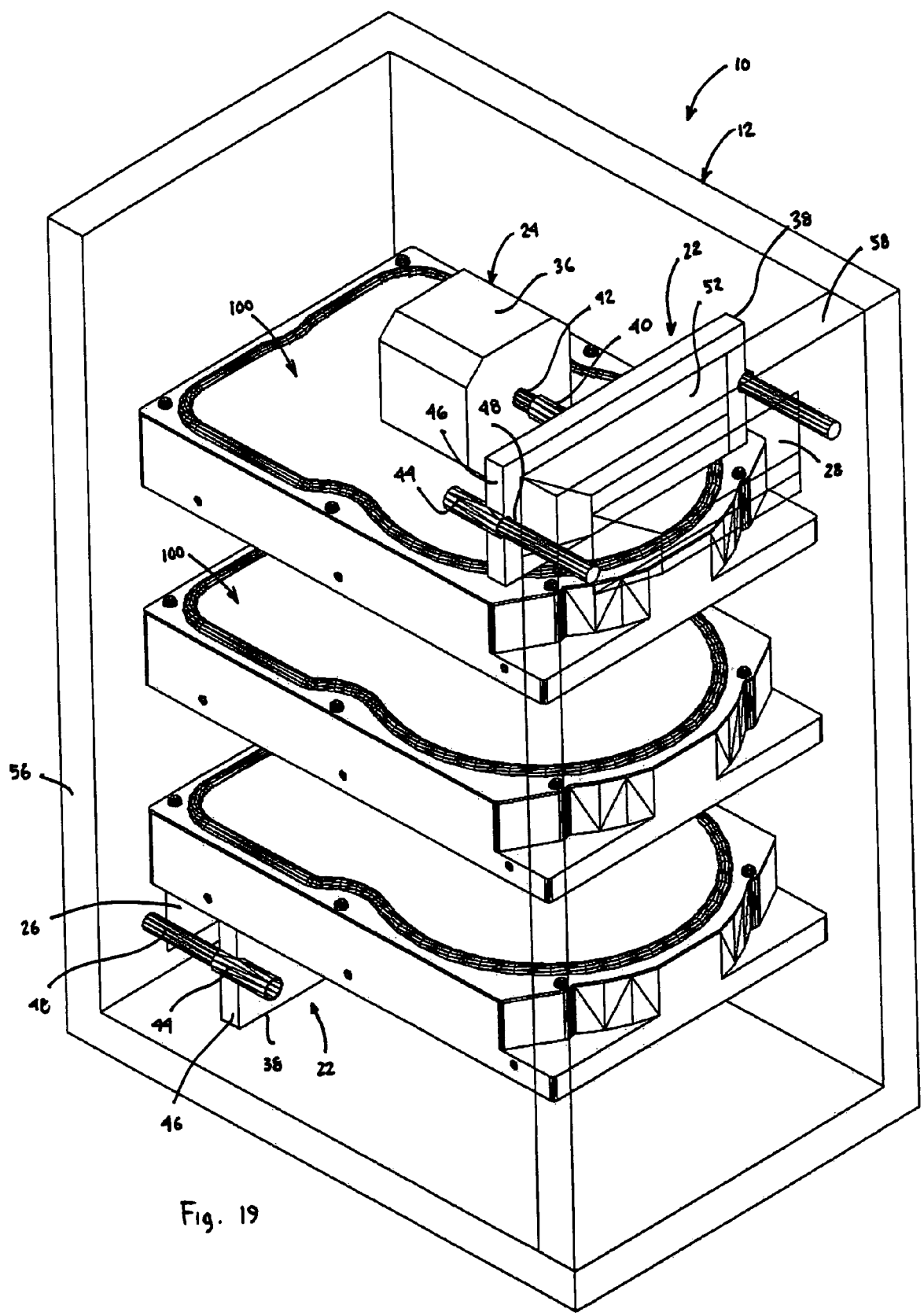
FIG. 19 is a still further perspective, cut-away view of the system of FIG. 17.
Figure 20:
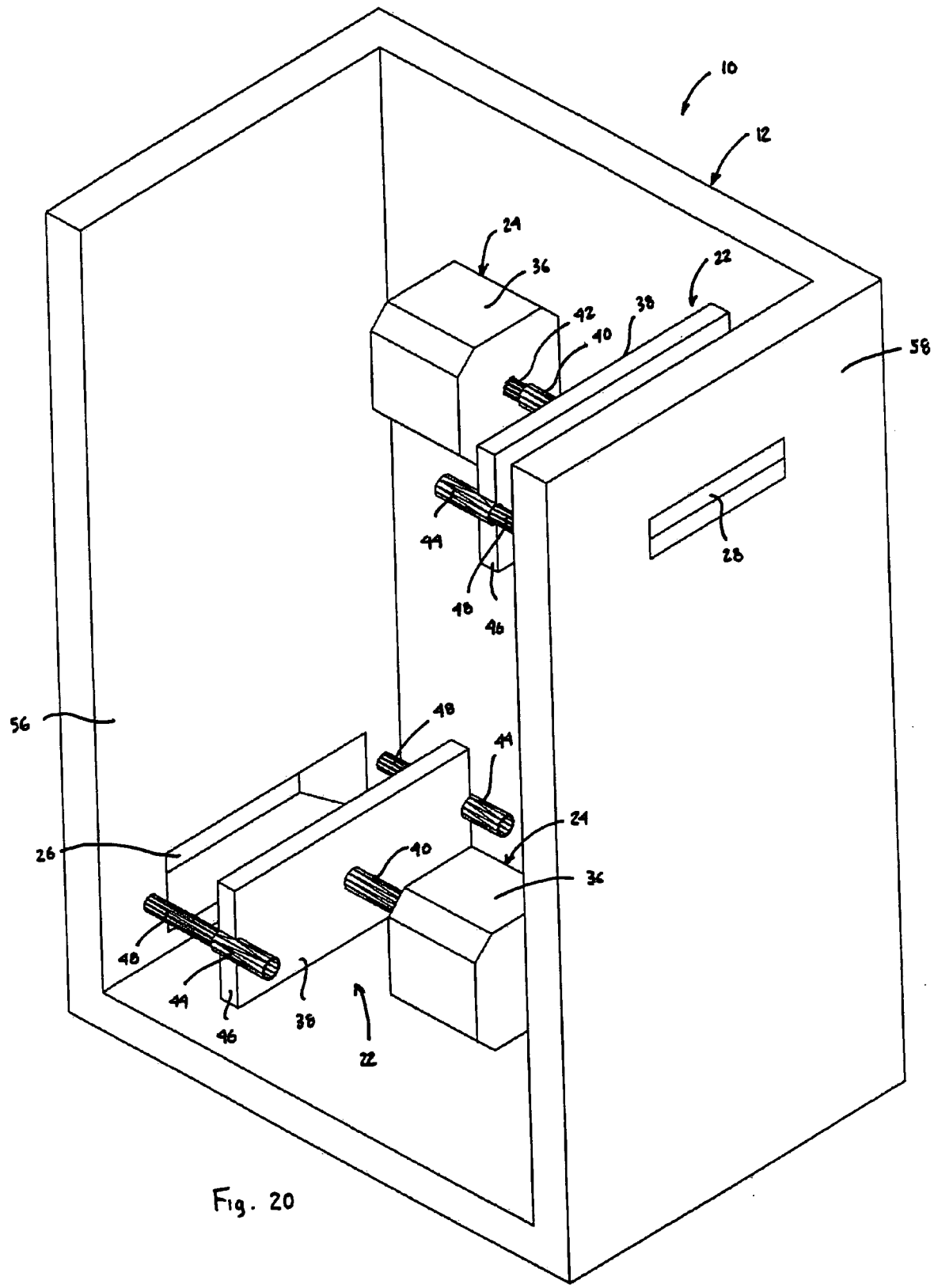
FIG. 20 is a further perspective, cut-away view of the system of FIG. 17 with certain portions removed for clarity.
Figure 21:
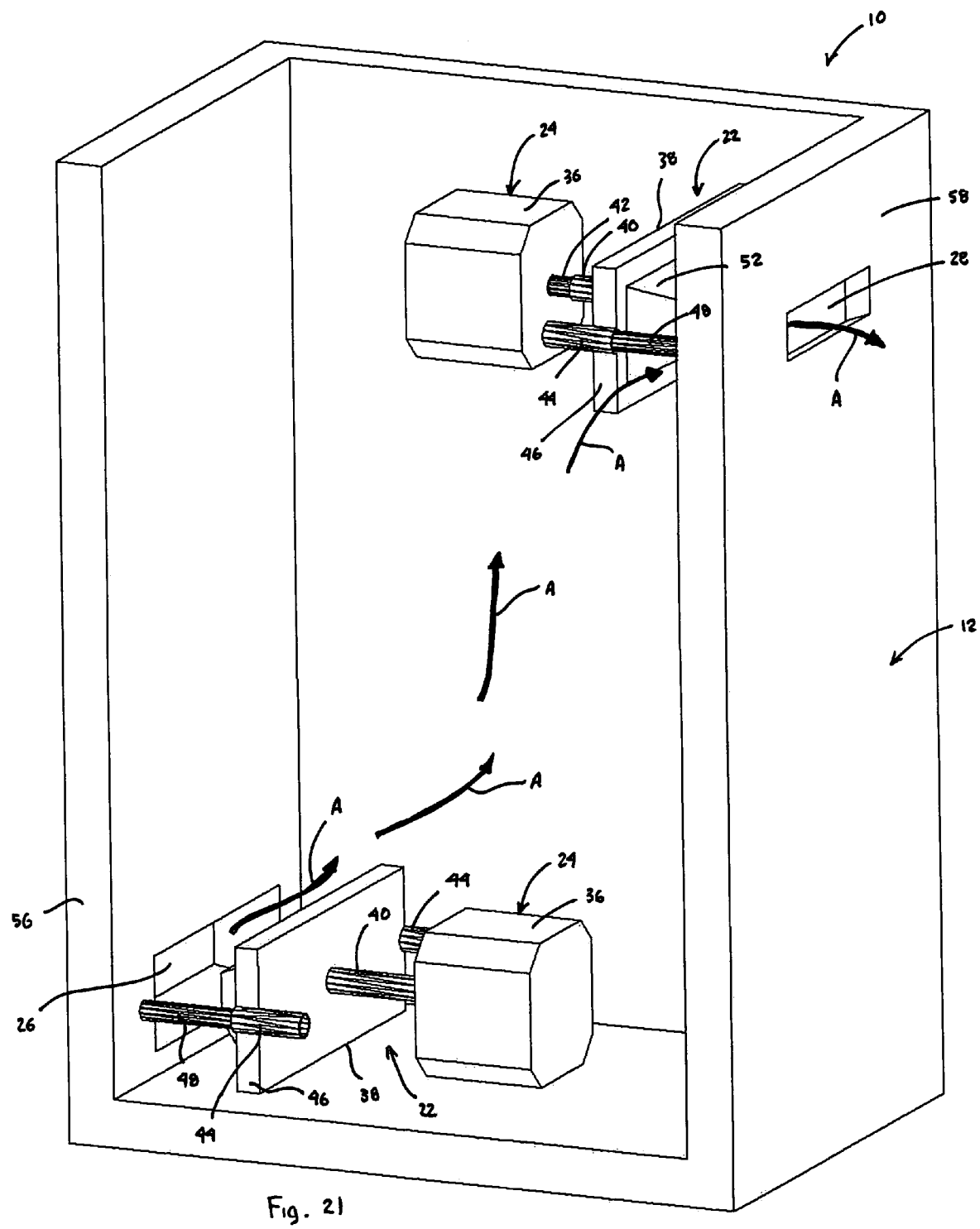
FIG. 21 is a perspective, cut-away view of the system of FIG. 20.
Figure 22:
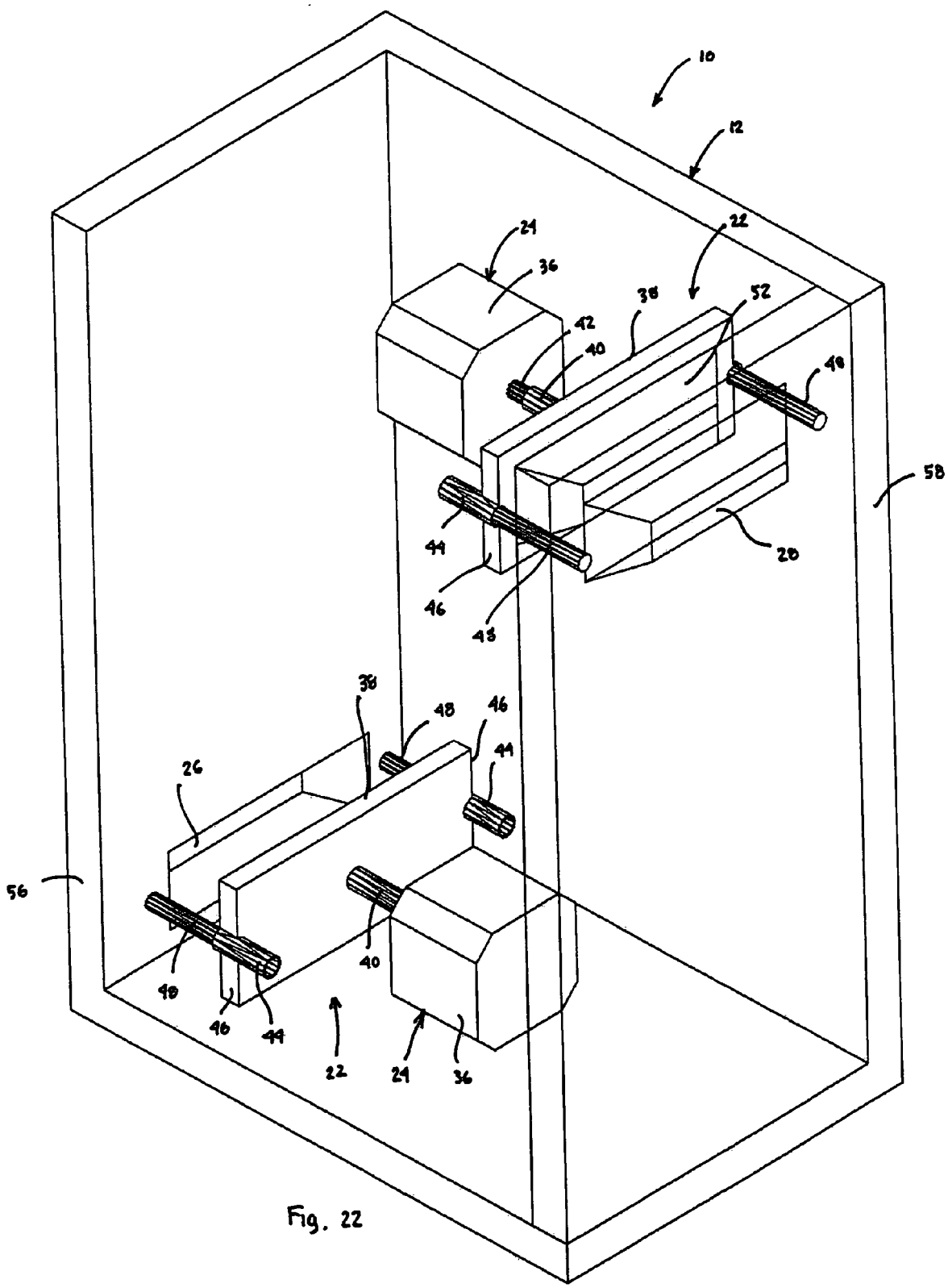
FIG. 22 is a further perspective, cut-away view of the system of FIG. 20.

In one embodiment, the first enclosure portion 60 and second enclosure portion 62 are in the form of a half sphere, such that when in the closed position, the first and second enclosure portions 60, 62 form a sealed sphere 64. FIG. 12 illustrates the sphere 64, when in an open position, and FIG. 13 illustrates the sphere 64 when in a closed position. When using this "sphere" structure of the enclosure 12, one or more legs 66 can be used to support the sphere 64, such that it does not topple or otherwise move in operation. As seen in FIG. 14, a mounting platform 68 can be used to mount the motor 36 within the sphere 64 or enclosure 12. The mounting platform 68 can be attached to an inner rim portion 70 extending around the first enclosure portion 60, specifically through attachment orifices 72 extending within the rim portion 70.

In operation, the present embodiment is similar to the retractable and extendable door 38 embodiment described above. In particular, a series of pins and sleeves are used to allow the second enclosure portion 62 to move away from and toward the first enclosure portion 60. Also similarly, a motor pin 42 extends from the motor 36, which is mounted on the mounting platform 68, and which serves to move the second enclosure portion 62. Therefore, the first enclosure portion 60 and the second enclosure portion 62 are movable between the open and closed position, and when in the closed position, seal the interior area 14 of the sphere 64 (or enclosure 12).

In yet another embodiment, and as illustrated in FIGS. 17-22, multiple storage media 100 can be positioned within the interior area 14 of the enclosure 12. However, in this embodiment, in order to provide appropriate circulation of air A through the enclosure 12, the entry circulation passageway 26 and exit circulation passageway 28 are on the first wall 56 and second, opposing wall 58, and further, these passageways 26, 28 are offset. Therefore, air is drawn or moved through the entry circulation passageway 26, flows underneath the storage media 100 and exits the exit circulation passageway 28. This circulation can be obtained by the above-mentioned fan 30 or similar cooling mechanism 20.

Returning to FIG. 3, the system 10 may also include a wire/cord passageway 74 extending through a wall 18 of the enclosure 12. This wire/cord passageway 74 provides a passage through which one or more cords or wires 102 can extend. As with the circulation passageway 16, the wire/cord passageway 74 must also be provided with some sealing mechanism 76. In addition, and as with the sealing mechanism 22, the sealing mechanism 76 seals the wire/cord passageway 74 in the event of the undesirable condition. Any number of wire/cord passageway sealing mechanisms 76 are envisioned. For example, a clamping device can be provided to clamp a gasket around the cords or wires 102. Further, some cutting device could be used to cut the cord and/or wire 102 and further act as a sealing door. Still further, a liquid metal material could be used to melt under certain situations (such as fire) and seal the wire/cord passageway 74. In essence, the wire/cord sealing mechanism 76 is used to sever, cut or otherwise crimp the cords and/or wires 102 during the event, and further protect the interior area 14 of the enclosure 12 during this event.

Similarly, many additional embodiments of the sealing mechanism 22 are envisioned. For example, the sealing mechanism 22 may be the rotating door 32 or retractable and extendable door 38, as discussed above. However, the sealing mechanism 22 may also be a hinged door that swings over and seals the circulation passageway 16; a valve arrangement that shuts and seals the circulation passageway 16; a liquid metal material that melts over and seals the circulation passageway 16, etc. In addition, the mutually opposing and movable enclosure portions 60, 62 also serve as a sealing mechanism 22. Still further, the above-discussed clamping or cutting mechanism would be useful when a refrigeration system is used, and the cooling medium flows through these tubes extending through the passageway 16. In the event of the condition, the sealing mechanism 22 could either clamp or sever the tube (and thus, act as a door).

While, discussed above, a fan 30 is the primary cooling mechanism 20, any cooling mechanism is envisioned. For example, a liquid cooling device, a heat sink, a refrigeration system, etc. Of course, such cooling mechanisms 20 may also be in addition to and supplemental to a primary cooling mechanism 22, such as the fan 30. For example, a combination of a fan 30 to circulate air A and a refrigeration system to circulate a liquid cooling medium could be used.

The present system 10 may also include a locking mechanism 78. This locking mechanism 78 would be in operative communication with the sealing mechanism 22, the sealing mechanism 76, the enclosure 12, the first enclosure portion 60, the second enclosure portion 62, etc. This locking mechanism 78 could lock various portions of the enclosure 12 and sealing mechanism 22, 76 to prevent unauthorized access to the interior area 14 of the enclosure 12, and thus the storage medium 100. In order to gain access, it is envisioned that any form or mechanism can be used. For example, a key could be supplied to unlock various components and sub-components of the system 10 after closure, and after the undesirable condition has passed.

In order to detect the undesirable condition, a sensor device 80 is used. See FIGS. 2 and 3. The sensor device 80 may be positioned within the interior area 14 of the enclosure, and this sensor device 80 is in communication with the sealing mechanism 22, 76. Further, the sensor device 80 is provided to sense the presence of the undesirable condition outside of the enclosure 12, and cause the sealing mechanism 22, 76 to seal the circulation passageway 16 and wire/cord passageway 74. Of course, this sensor device 80 could also be positioned outside of the enclosure 12 and communicate with the sealing mechanisms 22, 76 through a wire extending through the passageways 16, 74. Still further, the sensor device 80 may be in wireless communication with the sealing mechanisms 22, 76, such that the undesirable condition could be detected well before it reached the local area about the enclosure 12.

As is known in the art, the sensor device 80 may include various wires 102 extending from the sensor device 80 and configured to detect the physical presence or condition outside the enclosure 12, such as water, humidity, fire, heat, pressure, impact, lightening, etc. Once detected, the sensor device 80 transfers this information and instructs the sealing mechanisms 22, 76 to effect a seal against their respective passageways 16, 26, 28, 74. In addition, it is envisioned that a sensor device 80 may detect motion, such that in the event of unauthorized tampering, the sealing mechanisms 22, 76 are engaged. Further, with respect to the sphere 64 embodiment, the first enclosure portion 60 and the second enclosure portion 62 may close during a tampering situation, and only be reopened using the locking mechanism 78.

In a further embodiment, some display device 82 can be used to display information regarding the conditions within the enclosure 12, outside of the enclosure 12 in the environment, for example, temperatures, pressures, humidity levels, or other information, such as the status, operation or properties of the storage medium 100.

In yet another embodiment, a recording device 84 is used. This recording device, in communication with the display device 82, logs the conditions that are desired by the user, and these conditions can be displayed on a display device 82. In addition, these conditions can be communicated from the recording device 84 through the storage medium 100 to the user, or the storage medium 100 can even be used as the recording device 84. In any case, the parameters before, during and after the undesirable condition can be recorded on the recording device 84, as provided by the sensor device 80. In addition times, motion, temperature, humidity, pressure, etc. can all be quantified and logged onto the recording device 84 for use by the user after the undesirable condition has passed.

As discussed above, the enclosure 12 can be in any number of configurations, sizes and shapes. For example, the enclosure 12 can be in the form of the above-discussed cube or sphere. However, the enclosure 12 can be in the form of a standard computer casing, a safe, a cylinder, etc. For example, the system 10 of the present invention can be used as the user's personal computer, with the enclosure 12 housing the storage medium 100 (or hard drive), as well as other media that the user wishes to be protected from the undesirable condition.

The system 10 of the present invention may include many other beneficial features and functions. For example, some telecommunication or wireless signaling device can be positioned within the interior area 14 of the enclosure 12 in order to contact a user (or even upload data) when certain conditions are met, or when certain undesirable conditions occur. Such a function may be beneficial during a catastrophic event, where the entire enclosure 12 is swept away or otherwise destroyed.

In this manner, the present invention provides a storage medium protection system 10 that overcomes the deficiencies of the prior art. In particular, the system 10 is easy to use and safeguards the data and information on the storage medium 100 in the event of an undesirable condition. In addition, the system 10 of the present invention allows the data on the storage medium 100 to be backed up or otherwise safely stored onsite or locally. In addition, the system 10 provides a secure and effective protection against adverse physical or harsh environment occurrences.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A storage medium protection system for protecting at least one storage medium from the effects of at least one undesirable condition, the system comprising:
    an enclosure formed from a specified material resistant to the undesirable condition, the storage medium positioned within an interior area of the enclosure;
    at least one circulation passageway extending through a wall of the enclosure and configured to permit fluid communication of a cooling medium between the interior area of the enclosure and ambient air;
    at least one cooling mechanism in operational communication with the interior area of the enclosure and configured to cool the storage medium; and
    at least one sealing mechanism configured to seal the circulation passageway in the event of the undesirable condition, wherein the sealing mechanism is at least partially formed from the specified material resistant to the undesirable condition;
    wherein the enclosure comprises a first enclosure portion and a second enclosure portion, wherein the first and second enclosure portions are spaced in an open position, thereby forming the circulation passageway,
    wherein the first and second enclosure portions are abutting in a closed position, thereby acting as the sealing mechanism for sealing the circulation passageway in the event of the undesirable condition.

2. The protection system of claim 1, wherein the undesirable condition is tampering, fire, flood, heat, humidity, water, lightening, pressure, impact or any combination thereof.

3. The protection system of claim 1, wherein the specified material is a tamper-proof material, a fire-proof material, a heat-resistant material, a water-proof material, a water-resistant material, a lightening-proof material, an impact-resistant material, a pressure-resistant material or any combination thereof.

4. The protection system of claim 1, wherein the sealing mechanism is a rotating door positioned substantially adjacent the circulation passageway and configured to rotate over and seal the circulation passageway in the event of the undesirable condition.

5. The protection system of claim 1, further comprising a power supply device positioned in the interior area of the enclosure and configured to provide power to the storage medium, the cooling mechanism, the sealing mechanism or any combination thereof.

6. The protection system of claim 1, further comprising an entry circulation passageway configured to allow the cooling medium to be circulated therethrough and to the interior area of the enclosure, and an exit circulation passageway configured to allow the circulated cooling medium to exit the interior area of the enclosure, wherein each passageway can be sealed by the sealing mechanism.

7. The protection system of claim 6, wherein the cooling medium is air, and wherein the cooling mechanism is a fan positioned in operational communication with the interior area of the enclosure and configured to move ambient air through the entry circulation passageway, circulate the air through the interior area of the enclosure and force the circulated air out of the exit circulation passageway.

8. The protection system of claim 1, wherein the sealing mechanism is a retractable and extendable door configured to extend towards and seal the circulation passageway in the event of the undesirable condition.

9. The protection system of claim 1, wherein the cooling medium is air, and wherein the system further comprises an air direction element positioned in the interior area of the enclosure and configured to direct circulation air, which is moved through the circulation passageway, through an area adjacent the storage medium.

10. The protection system of claim 1, wherein the first and second enclosure portions are halves of a sphere, such that in the closed position, the first and second enclosure portions form a sealed sphere.

11. The protection system of claim 1, further comprising a locking mechanism configured to lock the sealing mechanism, the enclosure or any combination thereof, in a sealed or closed position, such that unauthorized access to the interior area of the enclosure, and thus the storage medium, is prevented.

12. The protection system of claim 1, wherein the enclosure is in the form of a standard computer case, a safe, a cube, a sphere, a cylinder or any combination thereof.

13. The protection system of claim 1, further comprising a sensor device positioned in operational communication with the sealing mechanism, the sensor device configured to sense the presence of the undesirable condition outside of the enclosure and cause the sealing mechanism to seal the circulation passageway.

14. The protection system of claim 1, wherein the storage mechanism is a hard drive.

15. A protection system for protecting at least one storage medium from the effects of at least one undesirable condition, the system comprising:
- an enclosure formed from a specified material resistant to the undesirable condition, the storage medium positioned within an interior area of the enclosure;
- an entry circulation passageway extending through a wall of the enclosure and configured to allow air to be moved therethrough and circulated in the interior area of the enclosure;
- an exit circulation passageway extending through a wall of the enclosure and configured to allow the circulated air to exit the interior area of the enclosure;
- a fan positioned in the interior area of the enclosure and configured to draw ambient air through the entry circulation passageway, circulate the air through the interior area of the enclosure and force the circulated air out of the exit circulation passageway; and
- at least one sealing mechanism configured to seal the entry circulation passageway and the exit circulation passageway in the event of the undesirable condition, wherein the sealing mechanism is at least partially formed from the specified material resistant to the undesirable condition;
- wherein the enclosure comprises a first enclosure portion and a second enclosure portion, wherein the first and second enclosure portions are spaced in an open position, thereby forming at least one of the entry and exit circulation passageways,
- wherein the first and second enclosure portions are abutted in a closed position, thereby acting as a sealing mechanism for sealing the at least one of the entry and exit circulation passageways in the event of the undesirable condition.

16. A storage medium protection system for protecting at least one storage medium from the effects of at least one undesirable condition, the system comprising:
- an enclosure formed from a specified material resistant to the undesirable condition, the storage medium positioned within an interior area of the enclosure;
- at least one circulation passageway extending through a wall of the enclosure and configured to permit fluid communication of a cooling medium between the interior area of the enclosure and ambient air;
- at least one cooling mechanism in operational communication with the interior area of the enclosure and configured to cool the storage medium; and
- at least one sealing mechanism configured to seal the circulation passageway in the event of the undesirable condition, wherein the sealing mechanism is at least partially formed from the specified material resistant to the undesirable condition;
- wherein the enclosure comprises a first enclosure portion and a second enclosure portion, wherein the first and second enclosure portions are spaced in an open position, thereby forming the circulation passageway,
- wherein the first and second enclosure portions are abutting in a closed position, thereby acting as the sealing mechanism for sealing the circulation passageway in the event of the undesirable condition,
- wherein the first and second enclosure portions are halves of a sphere, such that in the closed position, the first and second enclosure portions form a sealed sphere.

* * * * *